US012387673B2

(12) United States Patent
Jeong et al.

(10) Patent No.: US 12,387,673 B2
(45) Date of Patent: Aug. 12, 2025

(54) DISPLAY PANEL, DISPLAY APPARATUS INCLUDING THE SAME AND ELECTRONIC APPARATUS INCLUDING THE SAME

(71) Applicant: Samsung Display Co., LTD., Yongin-si (KR)

(72) Inventors: Ilhun Jeong, Yongin-si (KR); Minyoung Kang, Yongin-si (KR); Hye-Sung Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/195,631

(22) Filed: May 10, 2023

(65) Prior Publication Data

US 2024/0054953 A1 Feb. 15, 2024

(30) Foreign Application Priority Data

Aug. 9, 2022 (KR) ........................ 10-2022-0099280

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0842* (2013.01); *G09G 2300/0861* (2013.01); *G09G 2310/08* (2013.01);
(Continued)

(58) Field of Classification Search
None
See application file for complete search history.

(56) References Cited

U.S. PATENT DOCUMENTS 9,741,287 B2 * 8/2017 Na ........................ G09G 3/3233
10,062,321 B2 8/2018 Na et al.
10,297,656 B2 5/2019 Cho et al.
(Continued)

FOREIGN PATENT DOCUMENTS

KR 100916903 B1 9/2009
KR 101056281 B1 8/2011
KR 101329964 B1 11/2013

OTHER PUBLICATIONS

Extended European Search Report for Application No. 23189961.8-1210 dated Oct. 26, 2023.

*Primary Examiner* — Patrick N Edouard
*Assistant Examiner* — Peijie Shen
(74) *Attorney, Agent, or Firm* — CANTOR COLBURN LLP

(57) ABSTRACT

A display panel includes a first pixel circuit including a first pixel light emitting element, a first pixel driving transistor which applies a driving current to the first pixel light emitting element and a first pixel writing transistor which applies a data voltage to the first pixel driving transistor, a second pixel circuit disposed adjacent to the first pixel circuit and including a second pixel light emitting element, a second pixel driving transistor which applies a driving current to the second pixel light emitting element and a second pixel writing transistor which applies a data voltage to the second pixel driving transistor, a first initialization transistor including a gate electrode which receives an initialization gate signal, a first electrode connected to an anode electrode of the first pixel light emitting element and a second electrode connected to a gate electrode of the second pixel driving transistor.

18 Claims, 19 Drawing Sheets

(52) U.S. Cl.
CPC ............... *G09G 2320/0223* (2013.01); *G09G 2320/0247* (2013.01)

(56) References Cited

U.S. PATENT DOCUMENTS

| | | | | |
|---|---|---|---|---|
| 10,460,664 | B2 * | 10/2019 | Li | G09G 3/3233 |
| 11,749,204 | B1 * | 9/2023 | Zhou | G09G 3/3258 345/204 |
| 2004/0090434 | A1 * | 5/2004 | Miyazawa | G09G 3/3241 345/204 |
| 2012/0147060 | A1 * | 6/2012 | Jeong | G09G 3/3233 345/82 |
| 2014/0022288 | A1 * | 1/2014 | Tsuge | G09G 3/3233 345/76 |
| 2015/0109190 | A1 * | 4/2015 | Li | G09G 3/3426 345/82 |
| 2015/0187851 | A1 * | 7/2015 | Lee | H10K 59/121 438/23 |
| 2015/0294618 | A1 * | 10/2015 | Park | G09G 3/3291 345/78 |
| 2015/0356921 | A1 * | 12/2015 | Lee | G09G 3/3266 345/82 |
| 2015/0364083 | A1 * | 12/2015 | Jeon | G09G 3/3233 345/76 |
| 2016/0005384 | A1 * | 1/2016 | Yoon | G09G 3/3291 345/82 |
| 2017/0047011 | A1 * | 2/2017 | Yoon | G09G 3/3233 |
| 2017/0116925 | A1 * | 4/2017 | Lee | G09G 3/3275 |
| 2019/0096337 | A1 * | 3/2019 | Zhu | G09G 3/3258 |
| 2019/0114966 | A1 * | 4/2019 | Park | G09G 3/3233 |
| 2020/0226978 | A1 * | 7/2020 | Lin | H10K 59/1213 |
| 2021/0134232 | A1 * | 5/2021 | Ueno | G09G 3/3266 |
| 2021/0264857 | A1 * | 8/2021 | Wang | G09G 3/3258 |
| 2021/0319764 | A1 * | 10/2021 | Toyotaka | G09G 3/3233 |
| 2021/0376041 | A1 * | 12/2021 | Lee | H10K 59/1216 |
| 2022/0044634 | A1 * | 2/2022 | Ka | G09G 3/3291 |
| 2022/0271112 | A1 * | 8/2022 | Kim | H10K 59/1213 |
| 2022/0358880 | A1 * | 11/2022 | Yonebayashi | G09G 3/3233 |
| 2023/0094280 | A1 * | 3/2023 | Lee | G09G 3/3258 345/691 |
| 2023/0215360 | A1 * | 7/2023 | Kim | G09G 3/3233 |

* cited by examiner

DISPLAY PANEL, DISPLAY APPARATUS INCLUDING THE SAME AND ELECTRONIC APPARATUS INCLUDING THE SAME

This application claims priority to Korean Patent Application No. 10-2022-0099280, filed on Aug. 9, 2022, and all the benefits accruing therefrom under 35 U.S.C. § 119, the content of which in its entirety is herein incorporated by reference.

BACKGROUND

1. Field

Embodiments of the invention relate to a display panel, a display apparatus including the display panel and an electronic apparatus including the display apparatus. More particularly, embodiments of the invention relate to a display panel including an initialization circuit that simultaneously operates an initialization of an anode electrode of a light emitting element of a first pixel and an initialization of a gate electrode of a driving transistor of a second pixel, a display apparatus including the display panel and an electronic apparatus including the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

SUMMARY

In a pixel circuit of a conventional display panel, a gate voltage of a driving transistor may decrease due to a leakage of a gate electrode of the driving transistor during a low frequency driving as time lapses. Thus, a luminance of the light emitting element may increase during the low frequency driving as time lapses. When the luminance of the light emitting element increase in a low frequency driving mode, a flicker may be shown to a user and a bright spot defect may be shown to a user due to a luminance difference between pixels. Thus, a display quality of the display panel may be deteriorated.

In addition, a driver of an initialization gate signal and a driver of a data writing gate signal may not be integrally formed with each other because a driving load of the initialization gate signal and a driving load of the data writing gate signal are different from each other. Thus, a dead space for an integration of the driver of the initialization gate signal and the driver of the data writing gate signal may increase.

Embodiments of the invention provide a display panel that simultaneously operates an initialization of an anode electrode of a light emitting element of a first pixel and an initialization of a gate electrode of a driving transistor of a second pixel.

Embodiments of the invention also provide a display apparatus including the display panel.

Embodiments of the invention also provide an electronic apparatus including the display apparatus.

In an embodiment of a display panel according to the invention, the display panel includes a first pixel circuit, a second pixel circuit and a first initialization transistor. The first pixel circuit includes a first pixel light emitting element, a first pixel driving transistor which applies a first pixel driving current to the first pixel light emitting element and a first pixel writing transistor which applies a first pixel data voltage to the first pixel driving transistor. The second pixel circuit is disposed adjacent to the first pixel circuit. The second pixel circuit includes a second pixel light emitting element, a second pixel driving transistor which applies a second pixel driving current to the second pixel light emitting element and a second pixel writing transistor which applies a second pixel data voltage to the second pixel driving transistor. The first initialization transistor includes a gate electrode which receives an initialization gate signal, a first electrode connected to an anode electrode of the first pixel light emitting element and a second electrode connected to a gate electrode of the second pixel driving transistor.

In an embodiment, the display panel may further include a second initialization transistor including a gate electrode which receives the initialization gate signal, a first electrode which receives an initialization voltage and a second electrode connected to the first electrode of the first initialization transistor.

In an embodiment, the first pixel driving transistor may include a gate electrode connected to a first pixel first node, a first electrode connected to a first pixel second node and a second electrode connected to a first pixel third node. The first pixel writing transistor may include a gate electrode which receives a data writing gate signal, a first electrode which receives the first pixel data voltage and a second electrode connected to the first pixel second node. The first pixel light emitting element may include the anode electrode connected to a first pixel fourth node and a cathode electrode which receives a second power voltage. The first pixel circuit may further include a first pixel compensation transistor including a gate electrode which receives the data writing gate signal, a first electrode connected to the first pixel first node and a second electrode connected to the first pixel third node, a first pixel first emission transistor including a gate electrode which receives an emission signal, a first electrode which receives a first power voltage and a second electrode connected to the first pixel second node and a first pixel second emission transistor including a gate electrode which receives the emission signal, a first electrode connected to the first pixel third node and a second electrode connected to the first pixel fourth node.

In an embodiment, the second pixel driving transistor may include the gate electrode connected to a second pixel first node, a first electrode connected to a second pixel second node and a second electrode connected to a second pixel third node. The second pixel writing transistor may include a gate electrode which receives the data writing gate signal, a first electrode which receives the second pixel data voltage and a second electrode connected to the second pixel second node. The second pixel light emitting element may include an anode electrode connected to a second pixel fourth node and a cathode electrode which receives the second power voltage. The second pixel circuit may further include a second pixel compensation transistor including a gate electrode which receives the data writing gate signal, a first electrode connected to the second pixel first node and a second electrode connected to the second pixel third node, a second pixel first emission transistor including a gate electrode which receives the emission signal, a first electrode which receives the first power voltage and a second electrode connected to the second pixel second node and second pixel second emission transistor including a gate electrode which receives the emission signal, a first electrode connected to the second pixel third node and a second electrode connected to the second pixel fourth node.

In an embodiment, the first pixel circuit and the second pixel circuit may be disposed adjacent to each other in a same pixel row.

In an embodiment, the display panel may further includes an initialization circuit of a first outermost pixel disposed in a first end portion in the same pixel row, where the initialization circuit of the first outermost pixel may include a first outermost first initialization transistor including a gate electrode which receives the initialization gate signal, a first electrode connected to a second electrode of a first outermost second initialization transistor and a second electrode connected to a gate electrode of a driving transistor of the first outermost pixel and the first outermost second initialization transistor including a gate electrode which receives the initialization gate signal, a first electrode which receives an initialization voltage and the second electrode connected to the first electrode of the first outermost first initialization transistor.

In an embodiment, the display panel may further includes an initialization circuit of a first outermost pixel disposed in a first end portion in the same pixel row, where the initialization circuit of the first outermost pixel may include a first outermost initialization transistor including a gate electrode which receives the initialization gate signal, a first electrode which receives an initialization voltage and a second electrode connected to a gate electrode of a driving transistor of the first outermost pixel.

In an embodiment, the display panel may further includes an initialization circuit of a second outermost pixel disposed in a second end portion in the same pixel row, where the initialization circuit of the second outermost pixel may include a second outermost initialization transistor including a gate electrode which receives the initialization gate signal, a first electrode which receives an initialization voltage and a second electrode connected to an anode electrode of a light emitting element of the second outermost pixel.

In an embodiment, during a first duration, the initialization gate signal may be activated, a data writing gate signal applied to the first pixel writing transistor may be deactivated and an emission signal applied to the first pixel circuit to turn on the first pixel light emitting element may be deactivated. During a second duration, the initialization gate signal may be deactivated, the data writing gate signal may be activated and the emission signal may be deactivated.

In an embodiment, the initialization gate signal corresponding to an N-th pixel row may be the data writing gate signal corresponding to an (N−1)-th pixel row. N is natural number greater than one.

In an embodiment, during a first duration, the initialization gate signal may be activated, a data writing gate signal applied to the first pixel writing transistor may be deactivated and an emission signal applied to the first pixel circuit to turn on the first pixel light emitting element may be deactivated. During a second duration, the initialization gate signal may be activated, the data writing gate signal may be activated and the emission signal may be deactivated. During a third duration, the initialization gate signal may be deactivated, the data writing gate signal may be activated and the emission signal may be deactivated.

In an embodiment, the initialization gate signal corresponding to an N-th pixel row may be the data writing gate signal corresponding to an (N−1)-th pixel row. N is natural number greater than one.

In an embodiment, during a first duration, the initialization gate signal may be activated, a data writing gate signal applied to the first pixel writing transistor may be activated and an emission signal applied to the first pixel circuit to turn on the first pixel light emitting element may be deactivated. During a second duration, the initialization gate signal may be deactivated, the data writing gate signal may be activated and the emission signal may be deactivated.

In an embodiment, the first pixel circuit and the second pixel circuit may be disposed adjacent to each other in a same pixel column.

In an embodiment, the display panel may further include an initialization circuit of a first outermost pixel disposed in a first end portion in the same pixel column, where the initialization circuit of the first outermost pixel may include a first outermost first initialization transistor including a gate electrode which receives a dummy initialization gate signal, a first electrode connected to a second electrode of a first outermost second initialization transistor and a second electrode connected to a gate electrode of a driving transistor of the first outermost pixel and the first outermost second initialization transistor including a gate electrode which receives the dummy initialization gate signal, a first electrode which receives an initialization voltage and the second electrode connected to the first electrode of the first outermost first initialization transistor.

In an embodiment, the display panel may further include an initialization circuit of a first outermost pixel disposed in a first end portion in the same pixel column, where the initialization circuit of the first outermost pixel may include a first outermost initialization transistor including a gate electrode which receives a dummy initialization gate signal, a first electrode which receives an initialization voltage and a second electrode connected to a gate electrode of a driving transistor of the first outermost pixel.

In an embodiment, the display panel may further include an initialization circuit of a second outermost pixel disposed in a second end portion in the same pixel column, where the initialization circuit of the second outermost pixel may include a second outermost initialization transistor including a gate electrode which receives the initialization gate signal, a first electrode which receives an initialization voltage and a second electrode connected to an anode electrode of a light emitting element of the second outermost pixel.

In an embodiment, during a first duration, a previous pixel initialization gate signal corresponding to a previous pixel row may be activated, a present pixel initialization gate signal corresponding to a present pixel row may be deactivated, a present pixel data writing gate signal corresponding to the present pixel row may be deactivated and a present pixel emission signal corresponding to the present pixel row may be deactivated. During a second duration, the previous pixel initialization gate signal may be deactivated, the present pixel initialization gate signal may be activated, the present pixel data writing gate signal may be deactivated and the present pixel emission signal may be deactivated. During a third duration, the previous pixel initialization gate signal may be deactivated, the present pixel initialization gate signal may be deactivated, the present pixel data writing gate signal may be activated and the present pixel emission signal may be deactivated.

In an embodiment, the initialization gate signal corresponding to an N-th pixel row may be the data writing gate signal corresponding to an (N−1)-th pixel row. N is natural number greater than one.

In an embodiment, during a first duration, a previous pixel initialization gate signal corresponding to a previous pixel row may be activated, a present pixel initialization gate signal corresponding to a present pixel row may be deactivated, a present pixel data writing gate signal corresponding to the present pixel row may be deactivated and a present pixel emission signal corresponding to the present pixel row may be deactivated. During a second duration, the previous pixel initialization gate signal may be activated, the present pixel initialization gate signal may be activated, the present pixel data writing gate signal may be deactivated and the present pixel emission signal may be deactivated. During a third duration, the previous pixel initialization gate signal may be deactivated, the present pixel initialization gate signal may be activated, the present pixel data writing gate signal may be activated and the present pixel emission signal may be deactivated. During a fourth duration, the previous pixel initialization gate signal may be deactivated, the present pixel initialization gate signal may be deactivated, the present pixel data writing gate signal may be activated and the present pixel emission signal may be deactivated.

In an embodiment, the initialization gate signal corresponding to an N-th pixel row may be the data writing gate signal corresponding to an (N−1)-th pixel row. N is natural number greater than one.

In an embodiment, during a first duration, a previous pixel initialization gate signal corresponding to a previous pixel row may be activated, a present pixel initialization gate signal corresponding to a present pixel row may be deactivated, a present pixel data writing gate signal corresponding to the present pixel row may be deactivated and a present pixel emission signal corresponding to the present pixel row may be deactivated. During a second duration, the previous pixel initialization gate signal may be deactivated, the present pixel initialization gate signal may be activated, the present pixel data writing gate signal may be activated and the present pixel emission signal may be deactivated. During a third duration, the previous pixel initialization gate signal may be deactivated, the present pixel initialization gate signal may be deactivated, the present pixel data writing gate signal may be activated and the present pixel emission signal may be deactivated.

In an embodiment, during a first duration, a previous pixel initialization gate signal corresponding to a previous pixel row may be activated, a present pixel initialization gate signal corresponding to a present pixel row may be deactivated, a present pixel data writing gate signal corresponding to the present pixel row may be activated and a present pixel emission signal corresponding to the present pixel row may be deactivated. During a second duration, the previous pixel initialization gate signal may be deactivated, the present pixel initialization gate signal may be activated, the present pixel data writing gate signal may be activated and the present pixel emission signal may be deactivated. During a third duration, the previous pixel initialization gate signal may be deactivated, the present pixel initialization gate signal may be deactivated, the present pixel data writing gate signal may be activated and the present pixel emission signal may be deactivated.

In an embodiment of a display apparatus according to the invention, the display apparatus includes a display panel, a gate driver, a data driver and an emission driver. The display panel includes a first pixel circuit, a second pixel circuit and a first initialization transistor. The first pixel circuit includes a first pixel light emitting element, a first pixel driving transistor which applies a first pixel driving current to the first pixel light emitting element and a first pixel writing transistor which apply a first pixel data voltage to the first pixel driving transistor. The second pixel circuit is disposed adjacent to the first pixel circuit. The second pixel circuit includes a second pixel light emitting element, a second pixel driving transistor which applies a second pixel driving current to the second pixel light emitting element and a second pixel writing transistor which applies a second pixel data voltage to the second pixel driving transistor. The first initialization transistor includes a gate electrode which receives an initialization gate signal, a first electrode connected to an anode electrode of the first pixel light emitting element and a second electrode connected to a gate electrode of the second pixel driving transistor. The gate driver outputs the initialization gate signal and a data writing gate signal to the display panel. The data driver outputs the first pixel data voltage and the second pixel data voltage to the display panel. The emission driver outputs an emission signal to the display panel.

In an embodiment of an electronic apparatus according to the invention, the electronic apparatus includes a display panel, a gate driver, a data driver, an emission driver, a driving controller and a processor. The display panel includes a first pixel circuit, a second pixel circuit and a first initialization transistor. The first pixel circuit includes a first pixel light emitting element, a first pixel driving transistor which applies a first pixel driving current to the first pixel light emitting element and a first pixel writing transistor which applies a first pixel data voltage to the first pixel driving transistor. The second pixel circuit is disposed adjacent to the first pixel circuit. The second pixel circuit includes a second pixel light emitting element, a second pixel driving transistor which applies a second pixel driving current to the second pixel light emitting element and a second pixel writing transistor which applies a second pixel data voltage to the second pixel driving transistor. The first initialization transistor includes a gate electrode which receives an initialization gate signal, a first electrode connected to an anode electrode of the first pixel light emitting element and a second electrode connected to a gate electrode of the second pixel driving transistor. The gate driver outputs the initialization gate signal and a data writing gate signal to the display panel. The data driver outputs the first pixel data voltage and the second pixel data voltage to the display panel. The emission driver outputs an emission signal to the display panel. The driving controller controls the gate driver, the data driver and the emission driver. The processor outputs input image data and an input control signal to the driving controller.

According to embodiments of the invention, the display panel includes the initialization circuit which simultaneously operates the initialization of the anode electrode of the light emitting element of the first pixel and the initialization of the gate electrode of the driving transistor of the second pixel so that the leakage of the gate electrode of the driving transistor may be effectively prevented. Thus, the flicker in the low frequency driving mode may be effectively prevented and the bright spot defect due to the luminance difference between pixels may be effectively prevented. Accordingly, in such embodiments, the display quality of the display panel may be enhanced.

In such embodiments, the driver of the initialization gate signal and the driver of the data writing gate signal may be integrally formed with each other so that the manufacturing cost may be reduced and the dead space may be reduced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
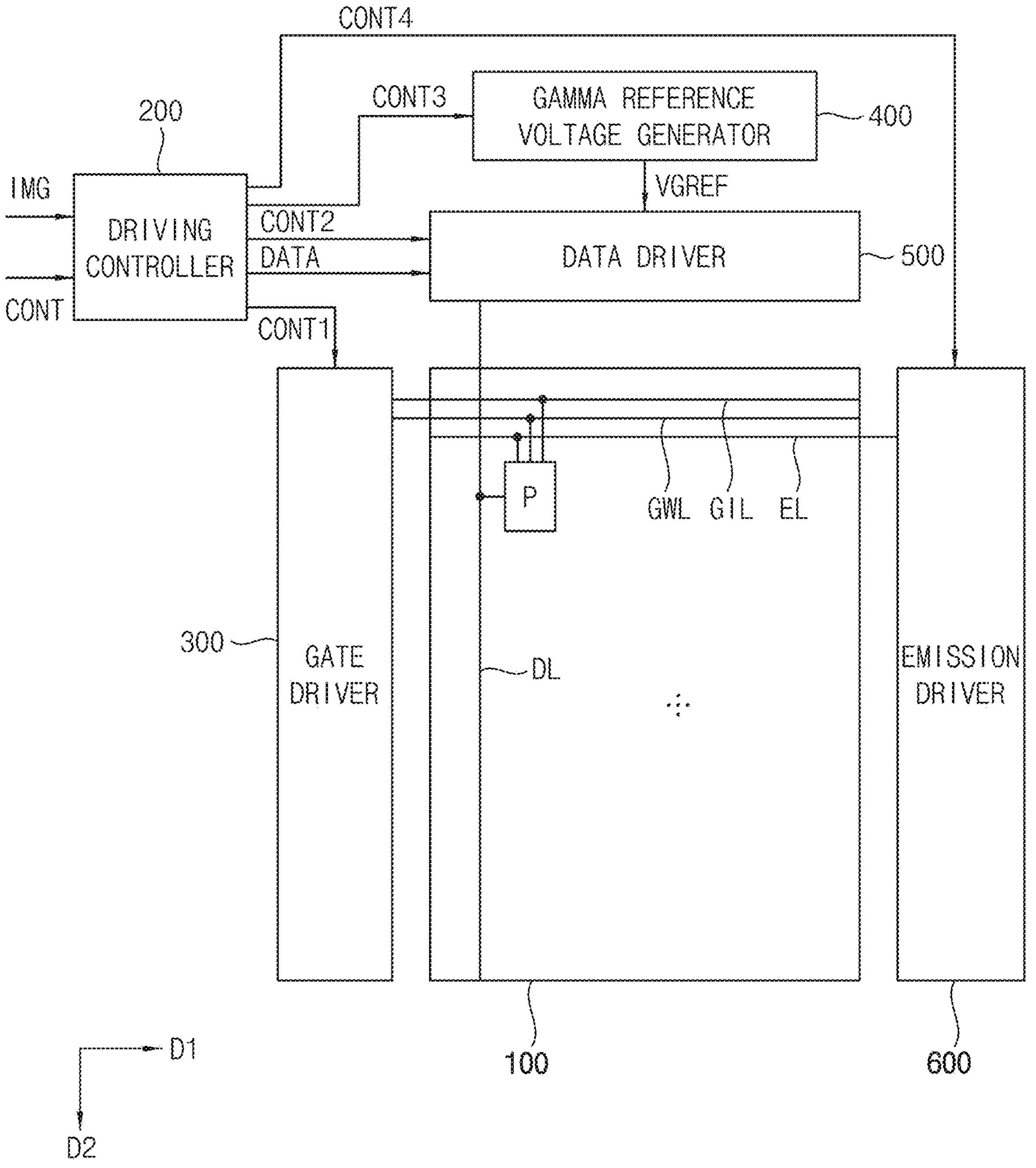
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate driver 300, a gamma reference voltage generator 400, a data driver 500 and an emission driver 600.

In an embodiment, for example, the driving controller 200 and the data driver 500 may be integrally formed with each other as one chip (or a single chip). In an embodiment, for example, the driving controller 200, the gamma reference voltage generator 400 and the data driver 500 may be integrally formed with each other as one chip. In an embodiment, for example, the driving controller 200, the gate driver 300, the gamma reference voltage generator 400 and the data driver 500 may be integrally formed with each other as one chip. In an embodiment, for example, the driving controller 200, the gate driver 300, the gamma reference voltage generator 400, the data driver 500 and the emission driver 600 may be integrally formed with each other as one chip.

The display panel 100 includes a plurality of gate lines GIL and GWL, a plurality of data lines DL, a plurality of emission lines EL, and a plurality of pixels P electrically connected to the gate lines GIL and GWL, the data lines DL and the emission lines EL. The gate lines GIL and GWL may extend in a first direction D1, the data lines DL may extend in a second direction D2 crossing the first direction D1 and the emission lines EL may extend in the first direction D1.

The driving controller 200 receives input image data IMG and an input control signal CONT from an external apparatus. In an embodiment, for example, the input image data IMG may include red image data, green image data and blue image data. The input image data IMG may further include white image data. Alternatively, the input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the fourth control signal CONT4 for controlling an operation of the emission driver 600 based on the input control signal CONT, and outputs the fourth control signal CONT4 to the emission driver 600.

The gate driver 300 may generate gate signals driving the gate lines GIL and GWL in response to the first control signal CONT1 received from the driving controller 200. The gate driver 300 may output the gate signals to the gate lines GIL and GWL. In an embodiment, for example, the gate driver 300 may be integrated on the display panel 100. In an embodiment, for example, the gate driver 300 may be mounted on the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200, or in the data driver 500.

The data driver 500 may receive the second control signal CONT2 and the data signal DATA from the driving controller 200, and may receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

The emission driver 600 may generate emission signals to drive the emission lines EL in response to the fourth control signal CONT4 received from the driving controller 200. The emission driver 600 may output the emission signals to the emission lines EL. In an embodiment, for example, the emission driver 600 may be integrated on the display panel 100. In an embodiment, for example, the emission driver 600 may be mounted on the display panel 100.

In an embodiment, as shown in FIG. 1, the gate driver 300 may be disposed in a first side of the pixels P of the display panel 100 and apply the gate signal to the pixels P and the emission driver 600 may be disposed in a second side of the pixels P of the display panel 100 and apply the emission signal to the pixels P, but the invention is limited thereto. Alternatively, the gate driver 300 and the emission driver 600 may be disposed in the first side of the pixels P of the display panel 100 and apply the gate signal and the emission signal to the pixels P. Alternatively, the gate drivers 300 and the emission drivers 600 may be disposed in both opposing sides of the pixels P of the display panel 100 and apply the gate signal and the emission signal to the pixels P.

In an embodiment, the gate driver 300 and the emission driver 600 may be integrally formed with each other as one chip.

Figure 2:
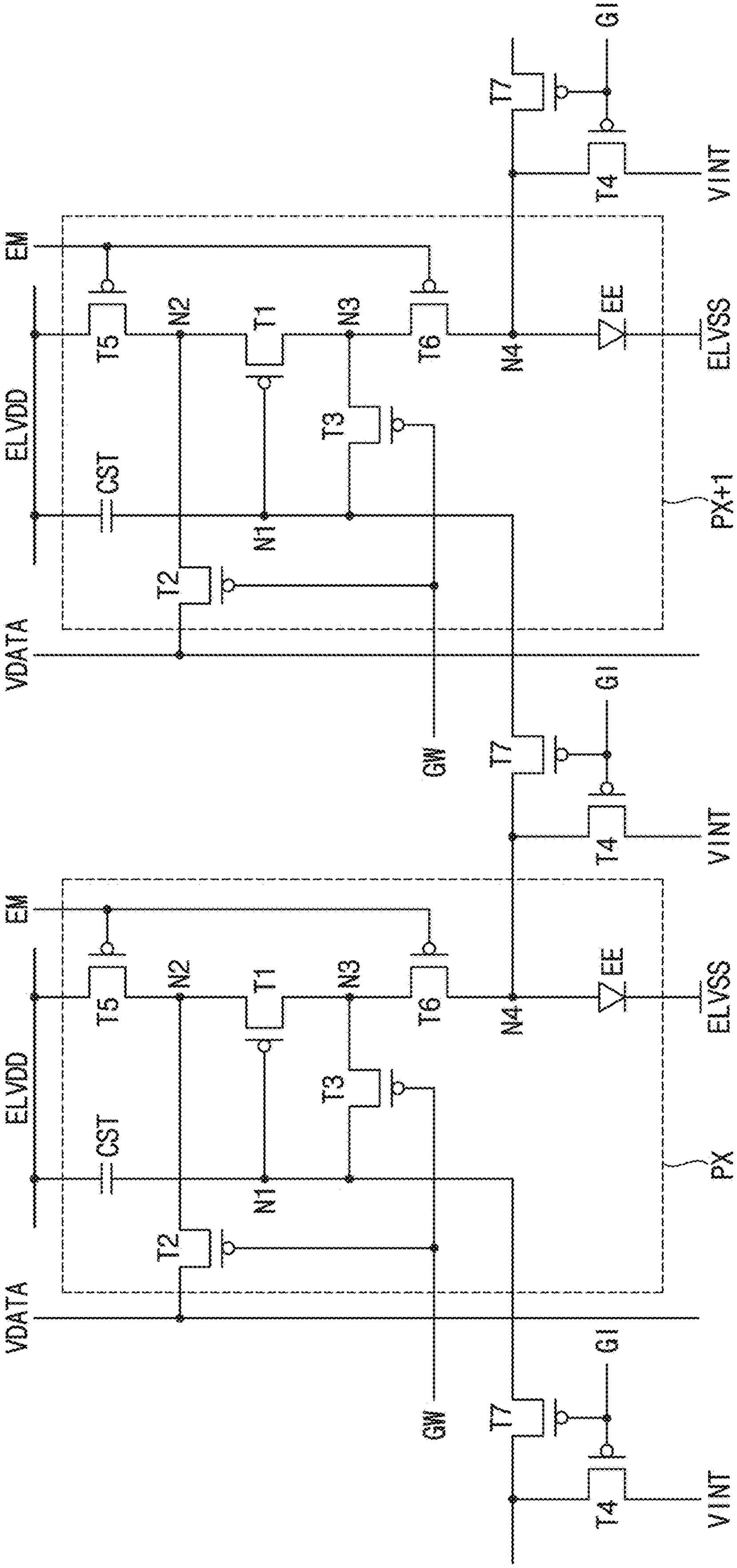
FIG. 2 is a circuit diagram illustrating a portion of a display panel of FIG. 1.

FIG. 2 is a circuit diagram illustrating a portion of the display panel 100 of FIG. 1.

Referring to FIGS. 1 and 2, the display panel 100 may include a first pixel circuit PX, a second pixel circuit PX+1 and an initialization circuit (T4 and T7 illustrated between the PX and PX+1) that simultaneously operates an initialization of an anode electrode of a light emitting element EE of the first pixel circuit PX and an initialization of a gate electrode of a driving transistor T1 of the second pixel circuit PX+1.

An initialization circuit T4 and T7 illustrated on a left side of the first pixel circuit PX may initialize a gate electrode of a driving transistor T1 of the first pixel circuit PX. An initialization circuit T4 and T7 illustrated on a right side of the second pixel circuit PX+1 may initialize an anode electrode of a light emitting element EE of the second pixel circuit PX+1.

In an embodiment, as described above, the initialization circuit T4 and T7 disposed between two adjacent pixel circuits may initialize the anode electrode of the light emitting element EE of a left pixel circuit of the two adjacent pixel circuits and may initialize the gate electrode of the gate electrode of the driving transistor T1 of the right pixel circuit of the two adjacent pixel circuits.

In an embodiment, the first pixel circuit PX and the second pixel circuit PX+1 may be disposed adjacent to each other in a same pixel row.

The first pixel circuit PX includes a first pixel light emitting element EE, a first pixel driving transistor T1 that applies a first pixel driving current to the first pixel light emitting element EE, and a first pixel writing transistor T2 that applies a first pixel data voltage VDATA to the first pixel driving transistor T1.

The first pixel driving transistor T1 may include the gate electrode connected to a first pixel first node N1, a first electrode connected to a first pixel second node N2 and a second electrode connected to a first pixel third node N3.

The first pixel writing transistor T2 may include a gate electrode that receives a data writing gate signal GW, a first electrode that receives the first pixel data voltage VDATA and a second electrode connected to the first pixel second node N2.

A first pixel light emitting element EE may include an anode electrode connected to a first pixel fourth node N4 and a cathode electrode that receives a second power voltage ELVSS.

The first pixel circuit PX may further include a first pixel compensation transistor T3 including a gate electrode that receives the data writing gate signal GW, a first electrode connected to the first pixel first node N1 and a second electrode connected to the first pixel third node N3, a first pixel first emission transistor T5 including a gate electrode that receives the emission signal EM, a first electrode that receives a first power voltage ELVDD and a second electrode connected to the first pixel second node N2, and a first pixel second emission transistor T6 including a gate electrode that receives the emission signal EM, a first electrode connected to the first pixel third node N3 and a second electrode connected to the first pixel fourth node N4.

The first pixel circuit PX may further include a first pixel storage capacitor CST including a first electrode that receives the first power voltage ELVDD and a second electrode connected to the first pixel first node N1.

The second pixel circuit PX+1 may be disposed adjacent to the first pixel circuit PX. The second pixel circuit PX+1 includes a second pixel light emitting element EE, a second pixel driving transistor T1 that applies a second pixel driving current to the second pixel light emitting element EE, and a second pixel writing transistor T2 that applies a second pixel data voltage VDATA to the second pixel driving transistor T1.

The second pixel driving transistor T1 may include the gate electrode connected to a second pixel first node N1, a first electrode connected to a second pixel second node N2 and a second electrode connected to a second pixel third node N3.

The second pixel writing transistor T2 may include a gate electrode that receives the data writing gate signal GW, a first electrode that receives the second pixel data voltage VDATA and a second electrode connected to the second pixel second node N2.

The second pixel light emitting element EE may include an anode electrode connected to a second pixel fourth node N4 and a cathode electrode that receives a second power voltage ELVSS.

The second pixel circuit PX+1 may further include a second pixel compensation transistor T3 including a gate electrode that receives the data writing gate signal GW, a first electrode connected to the second pixel first node N1 and a second electrode connected to the second pixel third node N3, a second pixel first emission transistor T5 including a gate electrode that receives the emission signal EM, a first electrode that receives the first power voltage ELVDD and a second electrode connected to the second pixel second node N2, and a second pixel second emission transistor T6 including a gate electrode that receives the emission signal EM, a first electrode connected to the second pixel third node N3 and a second electrode connected to the second pixel fourth node N4.

The second pixel circuit PX+1 may further include a second pixel storage capacitor CST including a first electrode that receives the first power voltage ELVDD and a second electrode connected to the second pixel first node N1.

The initialization circuit may include a first initialization transistor T7 including a gate electrode that receives an initialization gate signal GI, a first electrode connected to an anode electrode of the first pixel light emitting element (EE of PX) and a second electrode connected to the gate electrode of the second pixel driving transistor (T1 of PX+1).

The initialization circuit may further include a second initialization transistor T4 including a gate electrode that receives the initialization gate signal GI, a first electrode that receives an initialization voltage VINT and a second electrode connected to the first electrode of the first initialization transistor T7.

In a pixel circuit of a conventional display panel, a first electrode of an initialization transistor for initializing a gate electrode of a driving transistor is connected to the gate electrode of the driving transistor and a second electrode that directly receives the initialization voltage VINT. The data voltage VDATA and the initialization voltage VINT are applied to both of the first electrode and the second electrode of the conventional initialization transistor. A difference between the data voltage VDATA and the initialization voltage VINT may be great such that a current may be leaked at the conventional initialization transistor.

In an embodiment of the invention, the first electrode of the first initialization transistor T7 is connected to the anode electrode of the first pixel light emitting element EE of PX and the second electrode of the first initialization transistor T7 is connected to the gate electrode of the second pixel driving transistor T1 of PX+1. Thus, the voltage difference between the first electrode and the second electrode of the first initialization transistor T7 is substantially reduced compared to a conventional initialization transistor, in which a first electrode of an initialization transistor for initializing a gate electrode of a driving transistor is connected to the gate electrode of the driving transistor and a second electrode that directly receives the initialization voltage VINT, so that the current leakage of the first initialization transistor T7 may be substantially reduced.

Figure 3A:
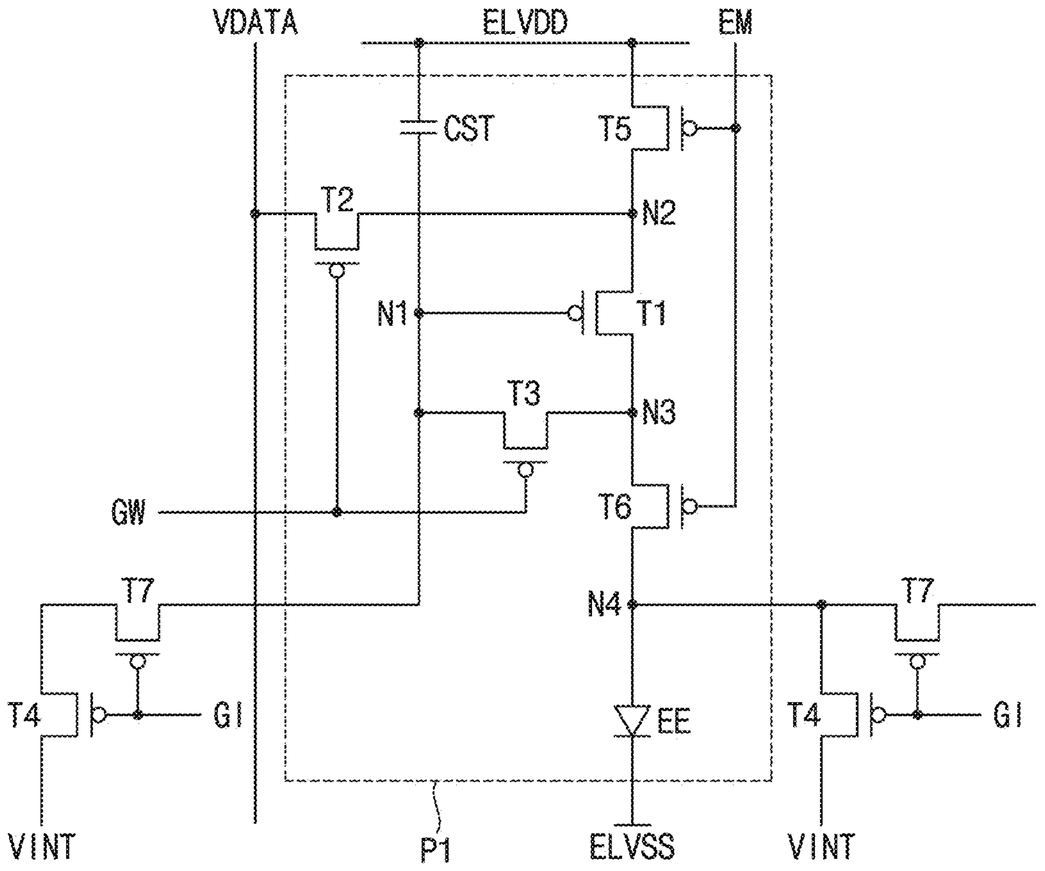
FIG. 3A is a circuit diagram illustrating an embodiment of a first pixel of a pixel row of the display panel of FIG. 1.

FIG. 3A is a circuit diagram illustrating an embodiment of a first pixel of a pixel row of the display panel 100 of FIG. 1.

In FIG. 2, the first pixel circuit PX and the second pixel circuit PX+1 are disposed in a same pixel row, the first pixel circuit PX has adjacent pixel circuits in both sides thereof in the same pixel row and the second pixel circuit PX+1 has adjacent pixel circuits in both sides thereof in the same pixel row. FIG. 3A illustrates a first outermost pixel P1 (e.g., a leftmost pixel) and an initialization circuit of the first outermost pixel P1. In an embodiment, for example, the first outermost pixel P1 is a leftmost pixel in the same pixel row such that a pixel does not exist on a left side of the first outermost pixel P1.

Referring to FIG. 3A, the initialization circuit of the first outermost pixel P1 disposed in a first end portion in a pixel row may include a first outermost first initialization transistor T7 including a gate electrode that receives the initialization gate signal GI, a first electrode connected to a second electrode of a first outermost second initialization transistor T4 and a second electrode connected to a gate electrode of the driving transistor T1 of the first outermost pixel P1, and the first outermost second initialization transistor T4 including a gate electrode that receives the initialization gate signal GI, a first electrode that receives the initialization voltage VINT and the second electrode connected to the first electrode of the first outermost first initialization transistor T7.

If the initialization circuit for initializing the first outermost pixel P1 is not provided, a gate electrode of a driving transistor T1 of the first outermost pixel P1 is not initialized. In an embodiment, the initialization circuit of the first outermost pixel P1 may include the first initialization transistor T7 and the second initialization transistor T4 similarly to a normal initialization circuit (described above referring to FIG. 2).

Figure 3B:
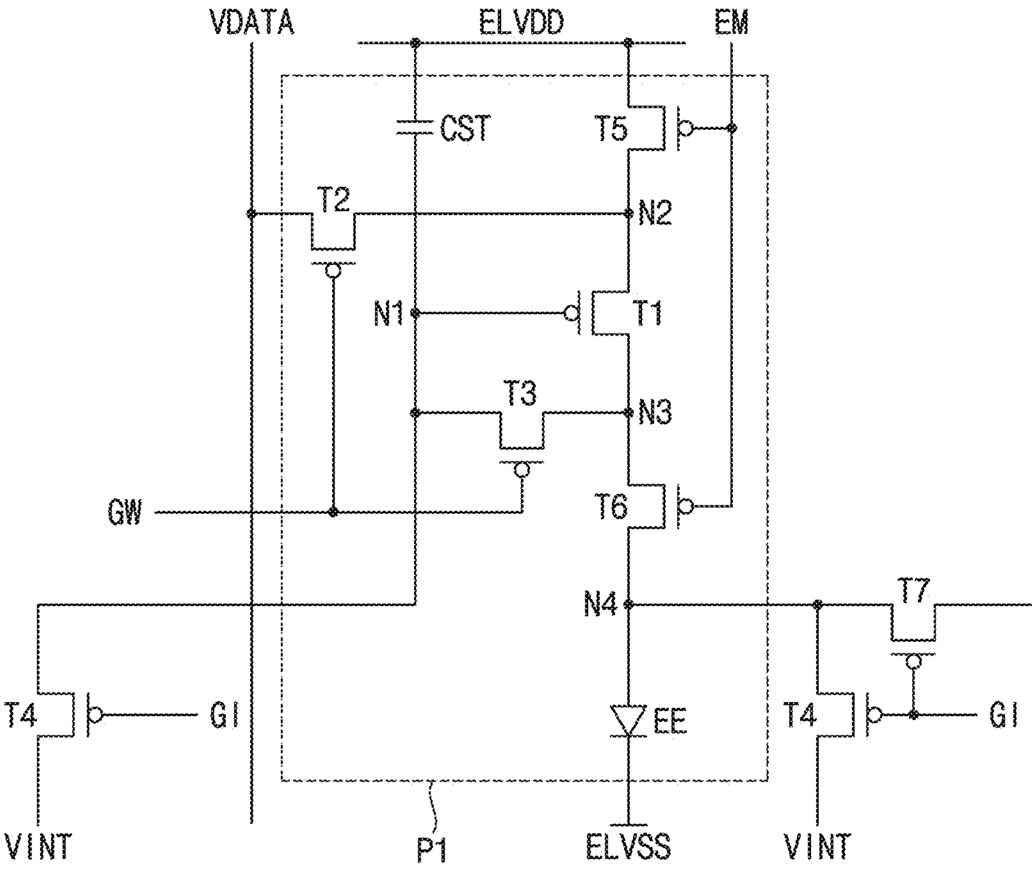
FIG. 3B is a circuit diagram illustrating an alternative embodiment of a first pixel of a pixel row of the display panel of FIG. 1.

FIG. 3B is a circuit diagram illustrating an alternative embodiment of a first pixel of a pixel row of the display panel 100 of FIG. 1.

Referring to FIG. 3B, an initialization circuit of a first outermost pixel P1 (e.g., a leftmost pixel) may include a first outermost initialization transistor T4 including a gate electrode that receives the initialization gate signal GI, a first electrode that receives the initialization voltage VINT and a second electrode connected to a gate electrode of a driving transistor T1 of the first outermost pixel P1.

If the initialization circuit for initializing the first outermost pixel P1 is not provided, a gate electrode of a driving transistor T1 of the first outermost pixel is not initialized. In an embodiment, the initialization circuit of the first outermost pixel P1 may include only the second initialization transistor T4 unlike the normal initialization circuit including both the first initialization transistor T7 and the second initialization transistor T4 (described above referring to FIG. 2). According to an embodiment, while a current leakage may slightly occur at the second initialization transistor T4, a dead space for the first initialization transistor T7 may be reduced.

Figure 4:
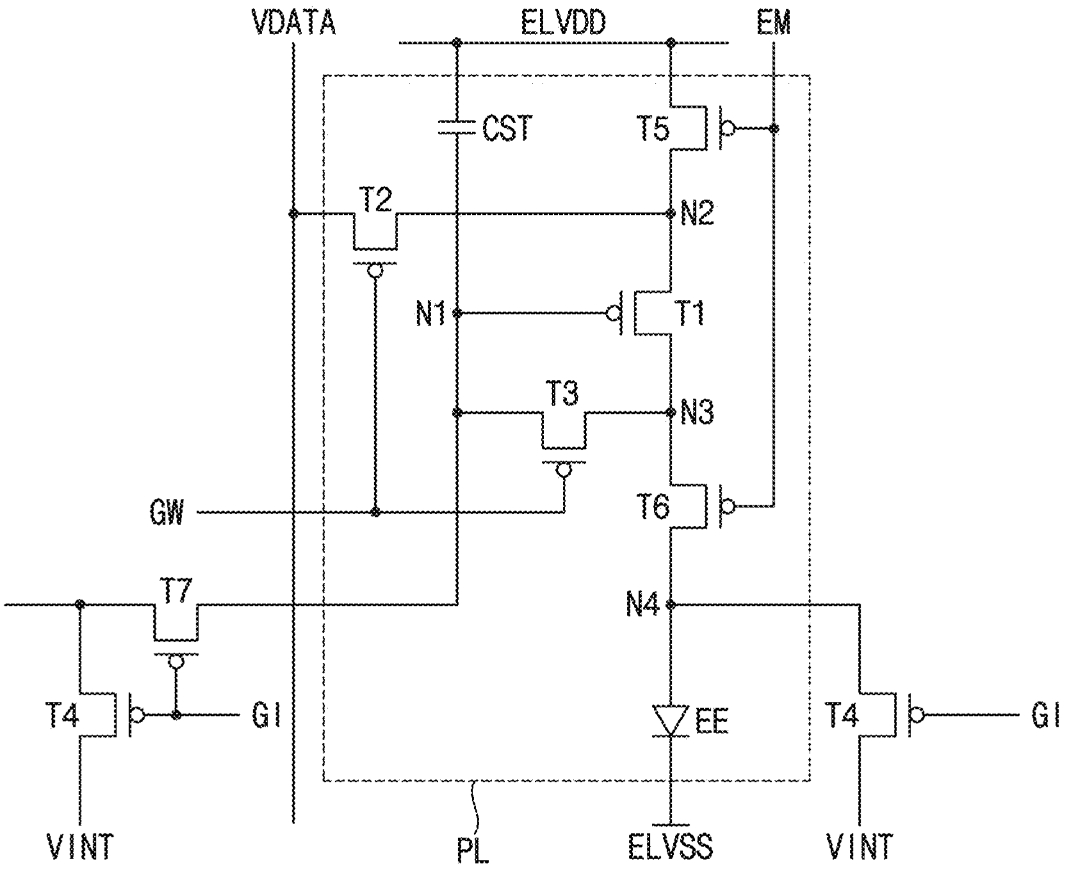
FIG. 4 is a circuit diagram illustrating an embodiment of a last pixel of the pixel row of the display panel of FIG. 1.

FIG. 4 is a circuit diagram illustrating an embodiment of a last pixel of the pixel row of the display panel 100 of FIG. 1.

In FIG. 2, the first pixel circuit PX and the second pixel circuit PX+1 are disposed in a same pixel row, the first pixel circuit PX has adjacent pixel circuits in both sides in the same pixel row and the second pixel circuit PX+1 has adjacent pixel circuits in both sides in the same pixel row. FIG. 4 illustrates a second outermost pixel PL (e.g., a rightmost pixel) and an initialization circuit of the second outermost pixel PL. In an embodiment, for example, the second outermost pixel PL is a rightmost pixel in the same pixel row such that a pixel does not exist on a right side of the second outermost pixel PL.

Referring to FIG. 4, the initialization circuit of the second outermost pixel PL may include a second outermost initialization transistor T4 including a gate electrode that receives the initialization gate signal GI, a first electrode that receives the initialization voltage VINT and a second electrode connected to an anode electrode of a light emitting element EE of the second outermost pixel PL.

If the initialization circuit for initializing the second outermost pixel PL is not provided, the anode electrode of the light emitting element EE of the second outermost pixel PL is not initialized. In an embodiment, the initialization circuit of the second outermost pixel PL may include only the second initialization transistor T4 unlike the normal initialization circuit including both the first initialization transistor T7 and the second initialization transistor T4 (described above referring to FIG. 2).

Figure 5:
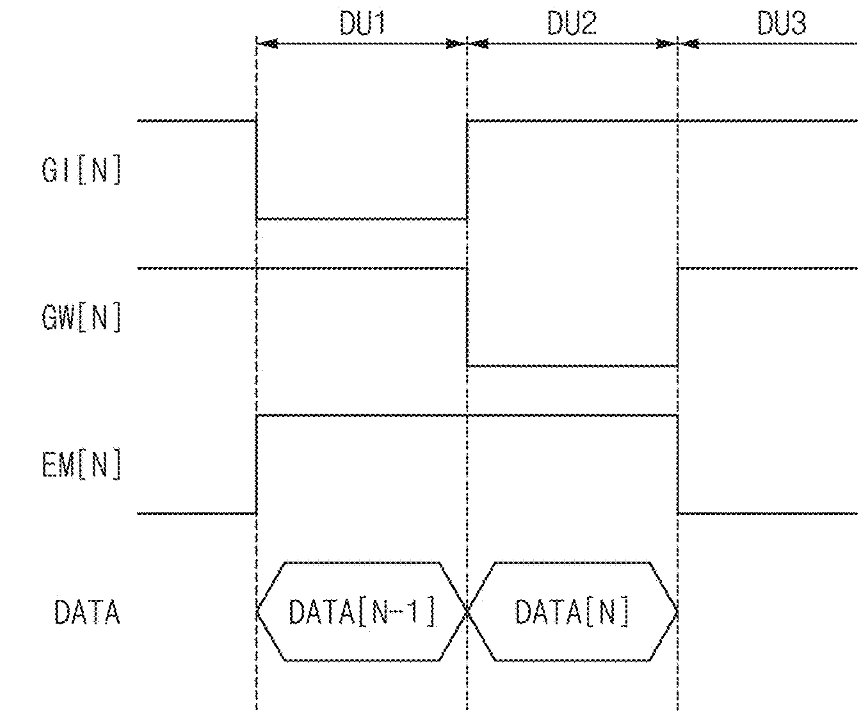
FIG. 5 is a timing diagram illustrating signals applied to the display panel of FIG. 1.

FIG. 5 is a timing diagram illustrating signals applied to the display panel 100 of FIG. 1.

Referring to FIGS. 1 to 5, during a first duration DU1, the first node N1 and the storage capacitor CST are initialized in response to the initialization gate signal GI[N]. During a second duration DU2, a threshold voltage (|VTH|) of the driving transistor T1 is compensated and the data voltage VDATA to which the threshold voltage compensation is applied is written to the first node N1 in response to the data writing gate signal GW[N]. During the second duration DU2, the anode electrode of the light emitting element EE is initialized in response to the data writing gate signal GW[N]. During a third duration DU3, the light emitting element EE emits light in response to the emission signal EM[N] so that the display panel 100 displays an image.

During the first duration DU1, the initialization gate signal GI[N] may be activated (or in a turn-on level), the data writing gate signal GW[N] may be deactivated (or in a turn-off level) and the emission signal EM[N] may be deactivated.

During the second duration DU2, the initialization gate signal GI[N] may be deactivated, the data writing gate signal GW[N] may be activated and the emission signal EM[N] may be deactivated.

During the third duration DU3, the initialization gate signal GI[N] may be deactivated, the data writing gate signal GW[N] may be deactivated and the emission signal EM[N] may be activated.

In an embodiment, active levels of the initialization gate signal GI[N], the data writing gate signal GW[N] and the emission signal EM[N] may be low levels. In such an embodiment, inactive levels of the initialization gate signal GI[N], the data writing gate signal GW[N] and the emission signal EM[N] may be high levels.

In such an embodiment, the data signal DATA may include a previous data signal DATA[N−1] applied during the first duration DU1 and the data signal DATA may have a present data signal DATA[N] applied during the second duration DU2.

During the second duration DU2, a voltage which is subtraction an absolute value (|VTH|) of the threshold voltage of the driving transistor T1 from the data voltage VDATA may be charged at the first node N1 along a path generated by the driving transistor T1, the writing transistor T2 and the compensation transistor T3 which are turned on.

During the third duration DU3, the emission signal EM may have an active level. When the emission signal EM has the active level, the fifth emission transistor T5 and the second emission transistor T6 are turned on. In addition, the driving transistor T1 is turned on by the data voltage VDATA.

A driving current flows through the first emission transistor T5, the driving transistor T1 and the second emission transistor T6 to drive the light emitting element EE. An intensity of the driving current may be determined by the level of the data voltage VDATA. A luminance of the light emitting element EE is determined by the intensity of the driving current.

The threshold voltage (|VTH|) is compensated during the second duration DU2, so that the driving current may be determined regardless of the threshold voltage (|VTH|) of the driving transistor T1 when the light emitting element EE emits the light during the third duration DU3.

In an embodiment, the initialization gate signal GI[N] has an active period corresponding to one horizontal period (1H), the data writing gate signal GW[N] has an active period corresponding to one horizontal period (1H) and the active period of the initialization gate signal GI[N] and the active period of the data writing gate signal GW[N] may not overlap each other. In such an embodiment, as shown in FIG. 5, an inactive period of the emission signal EM[N] may correspond to two horizontal periods (2H). Alternatively, the inactive period of the emission signal EM[N] may be longer than two horizontal periods (2H).

In an embodiment, a driver for generating the initialization gate signal GI[N] and a driver for generating the data write gate signal GW[N] may be separately provided.

According to an embodiment, the display panel 100 includes the initialization circuit T4 and T7 that simultaneously operates the initialization of the anode electrode of the light emitting element EE of the first pixel PX and the initialization of the gate electrode of the driving transistor T1 of the second pixel PX+1 so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced or improved.

Figure 6:
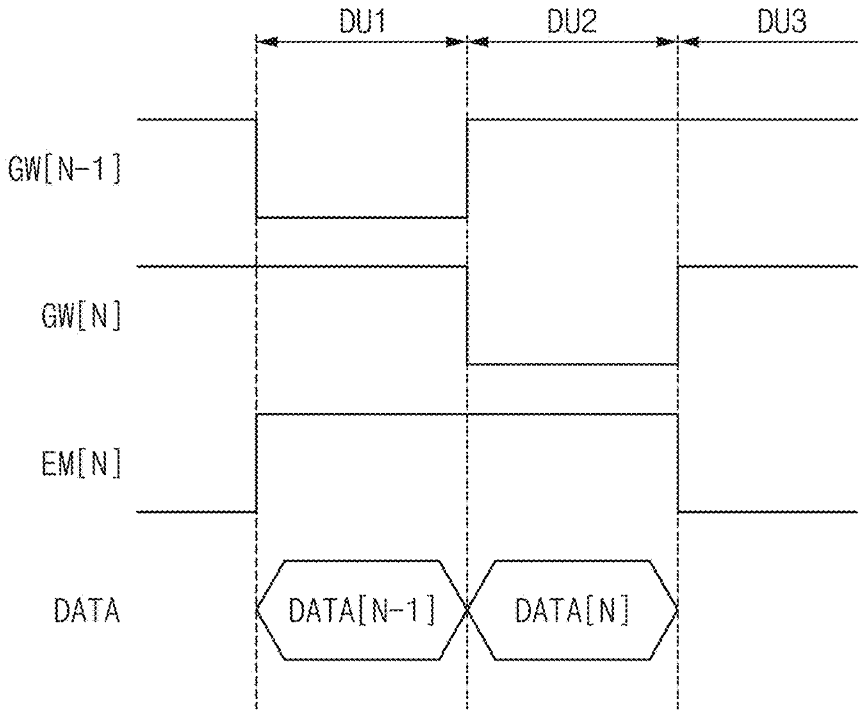
FIG. 6 is a timing diagram illustrating signals applied to a display panel of a display apparatus according to an embodiment of the invention.

FIG. 6 is a timing diagram illustrating signals applied to a display panel of a display apparatus according to an embodiment of the invention.

The display panel and the display apparatus including the display panel according to the embodiment shown in FIG. 6 is substantially the same as the display panel and the display apparatus including the display panel according to the embodiment described above referring to FIGS. 1 to 5 except for signals applied to the display panel. Thus, the same reference numerals will be used to refer to the same or like elements as those described above with reference to FIGS. 1 to 5, and any repetitive detailed description thereof will be omitted.

Referring to FIGS. 1 to 4 and 6, in an embodiment, the initialization gate signal GI[N] corresponding to an N-th pixel row may be the data writing gate signal GW[N−1] corresponding to an (N−1)-th pixel row. Herein, N is a natural number greater than one.

During a first duration DU1, the initialization gate signal GW[N−1] may be activated, the data writing gate signal GW[N] may be deactivated and the emission signal EM[N] may be deactivated.

During a second duration DU2, the initialization gate signal GW[N−1] may be deactivated, the data writing gate signal GW[N] may be activated and the emission signal EM[N] may be deactivated.

In an embodiment, the initialization gate signal GW[N−1] has an active period corresponding to one horizontal period (1H), the data writing gate signal GW[N] has an active period corresponding to one horizontal period (1H) and the active period of the initialization gate signal GW[N−1] and the active period of the data writing gate signal GW[N] may not overlap each other. In such an embodiment, as shown in FIG. 6, an inactive period of the emission signal EM[N] may correspond to two horizontal periods (2H). Alternatively, the inactive period of the emission signal EM[N] may be longer than two horizontal periods (2H).

In an embodiment, a driver for generating the initialization gate signal GW[N−1] and a driver for generating the data write gate signal GW[N] may be integrally formed with each other as one chip. In an embodiment, for example, the driver of the initialization gate signal GW[N−1] and the driver of the data writing gate signal GW[N] may be a same driver. In such an embodiment, for example, a previous data write gate signal GW[N−1] is used as the initialization gate signal GW[N−1] so that the initialization gate signal GW[N−1] and the data write gate signal GW[N] may be generated from the same driver.

According to an embodiment, the display panel 100 includes the initialization circuit T4 and T7 that simultaneously operates the initialization of the anode electrode of the light emitting element EE of the first pixel PX and the initialization of the gate electrode of the driving transistor T1 of the second pixel PX+1 so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

In such an embodiment, the driver of the initialization gate signal GW[N−1] and the driver of the data writing gate signal GW[N] may be integrally formed with each other as one chip (or one driver) so that the manufacturing cost may be reduced and the dead space may be reduced.

Figure 7:
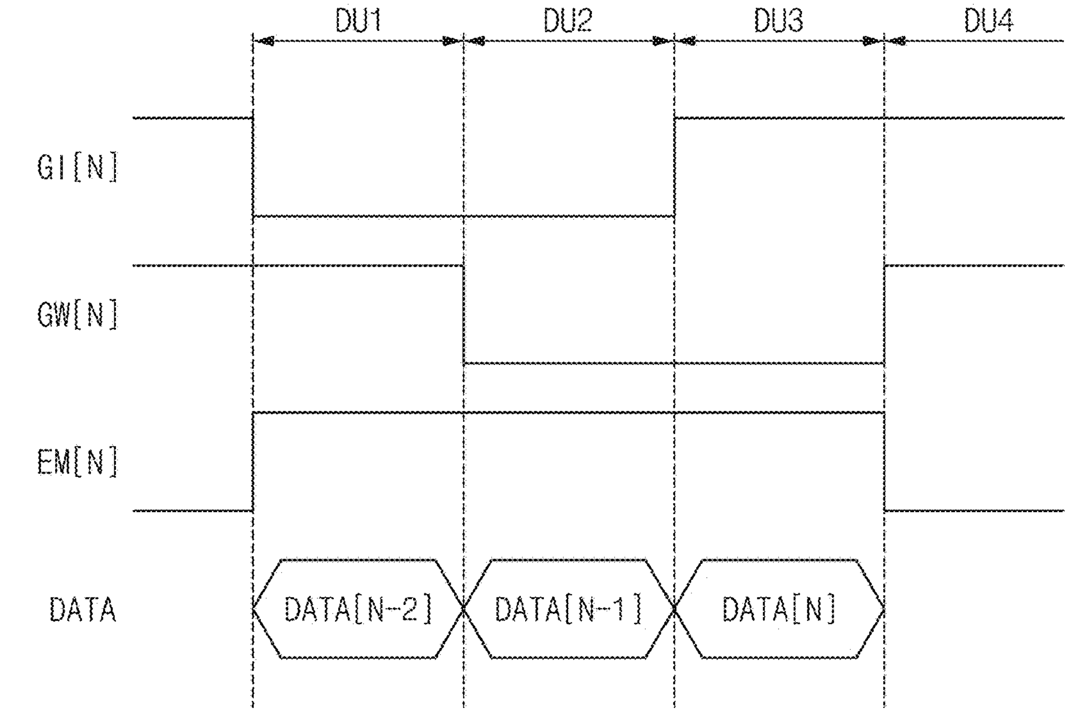
FIG. 7 is a timing diagram illustrating signals applied to a display panel of a display apparatus according to an embodiment of the invention.

FIG. 7 is a timing diagram illustrating signals applied to a display panel of a display apparatus according to an embodiment of the invention.

The display panel and the display apparatus including the display panel according to the embodiment shown in FIG. 7 is substantially the same as the display panel and the display apparatus including the display panel according to the embodiments described above referring to FIGS. 1 to 5 except for signals applied to the display panel. Thus, the same reference numerals will be used to refer to the same or like elements as those described above with reference to FIGS. 1 to 5 and any repetitive detailed description thereof will be omitted.

Referring to FIGS. 1 to 4 and 7, during a first duration DU1, the initialization gate signal GI[N] may be activated, the data writing gate signal GW[N] may be deactivated, and the emission signal EM[N] may be deactivated.

During a second duration DU2, the initialization gate signal GI[N] may be activated, the data writing gate signal GW[N] may be activated, and the emission signal EM[N] may be deactivated.

During a third duration DU3, the initialization gate signal GI[N] may be deactivated, the data writing gate signal GW[N] may be activated, and the emission signal EM[N] may be deactivated.

During a fourth duration DU4, the initialization gate signal GI[N] may be deactivated, the data writing gate signal GW[N] may be deactivated, and the emission signal EM[N] may be activated.

During the first duration DU1, the data signal DATA may have a second previous data signal DATA[N−2], during the second duration DU2, the data signal DATA may have a first previous data signal DATA[N−1] and during the second duration DU3, the data signal DATA may have a present data signal DATA[N].

In an embodiment, the initialization gate signal GI[N] has an active period corresponding to two horizontal periods (2H), the data writing gate signal GW[N] has an active period corresponding to two horizontal periods (2H) and the active period of the initialization gate signal GI[N] and the active period of the data writing gate signal GW[N] overlap each other for one horizontal period (1H). In such an embodiment, as shown in FIG. 7, an inactive period of the emission signal EM[N] may correspond to three horizontal periods (3H). Alternatively, the inactive period of the emission signal EM[N] may be longer than three horizontal periods (3H).

In an embodiment where the initialization gate signal GI[N] has the active period corresponding to two horizontal periods (2H), the initialization time of the gate electrode of the driving transistor T1 and the anode electrode of the light emitting element EE is increased compared to a case where the initialization gate signal GI[N] has an active period corresponding to one horizontal period (1H) so that the display quality of the display panel 100 may be enhanced. In such an embodiment, where the data writing gate signal GW[N] has the active period corresponding to two horizontal periods (2H), the charging time of the data voltage VDATA is increased compared to a case where the data writing gate signal GW[N] has an active period corresponding to one horizontal period (1H) so that the display quality of the display panel 100 may be enhanced.

In an embodiment, a driver for generating the initialization gate signal GI[N] and a driver for generating the data write gate signal GW[N] may be separately provided.

According to an embodiment, the display panel 100 includes the initialization circuit T4 and T7 that simultaneously operates the initialization of the anode electrode of the light emitting element EE of the first pixel PX and the initialization of the gate electrode of the driving transistor T1 of the second pixel PX+1 so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

Figure 8:
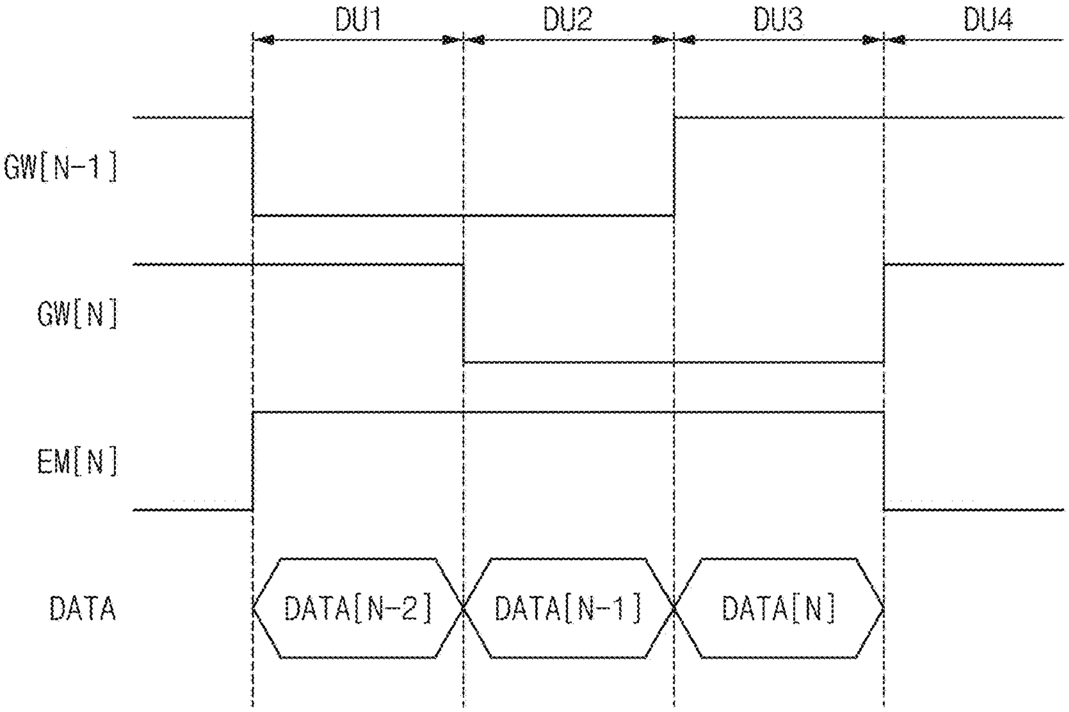
FIG. 8 is a timing diagram illustrating signals applied to a display panel of a display apparatus according to an embodiment of the invention.

FIG. 8 is a timing diagram illustrating signals applied to a display panel of a display apparatus according to an embodiment of the invention.

The display panel and the display apparatus including the display panel according to the embodiment shown in FIG. 8 is substantially the same as the display panel and the display apparatus including the display panel according to the embodiments described above referring to FIG. 7 except for signals applied to the display panel. Thus, the same reference numerals will be used to refer to the same or like elements as those described above with reference to FIG. 7 and any repetitive detailed description thereof will be omitted.

Referring to FIGS. 1 to 4, 7 and 8, in an embodiment, the initialization gate signal GI[N] corresponding to an N-th pixel row may be the data writing gate signal GW[N−1] corresponding to an (N−1)-th pixel row. Herein, N is a natural number greater than one.

In an embodiment, the initialization gate signal GW[N−1] has an active period corresponding to two horizontal periods (2H), the data writing gate signal GW[N] has an active period corresponding to two horizontal periods (2H) and the active period of the initialization gate signal GW[N−1] and the active period of the data writing gate signal GW[N] overlap each other for one horizontal period (1H). In such an embodiment, as shown in FIG. 8, an inactive period of the emission signal EM[N] may correspond to three horizontal periods (3H). Alternatively, the inactive period of the emission signal EM[N] may be longer than three horizontal periods (3H).

In an embodiment, a driver for generating the initialization gate signal GW[N−1] and a driver for generating the data write gate signal GW[N] may be integrally formed with each other as one chip. In an embodiment, for example, the driver of the initialization gate signal GW[N−1] and the driver of the data writing gate signal GW[N] may be a same driver. In an embodiment, for example, a previous data write gate signal GW[N−1] is used as the initialization gate signal GW[N−1] so that the initialization gate signal GW[N−1] and the data write gate signal GW[N] may be generated from the same driver.

According to an embodiment, the display panel 100 includes the initialization circuit T4 and T7 that simultaneously operates the initialization of the anode electrode of the light emitting element EE of the first pixel PX and the initialization of the gate electrode of the driving transistor T1 of the second pixel PX+1 so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

In such an embodiment, the driver of the initialization gate signal GW[N−1] and the driver of the data writing gate signal GW[N] may be integrally formed with each other as one driver so that the manufacturing cost may be reduced and the dead space may be reduced.

Figure 9:
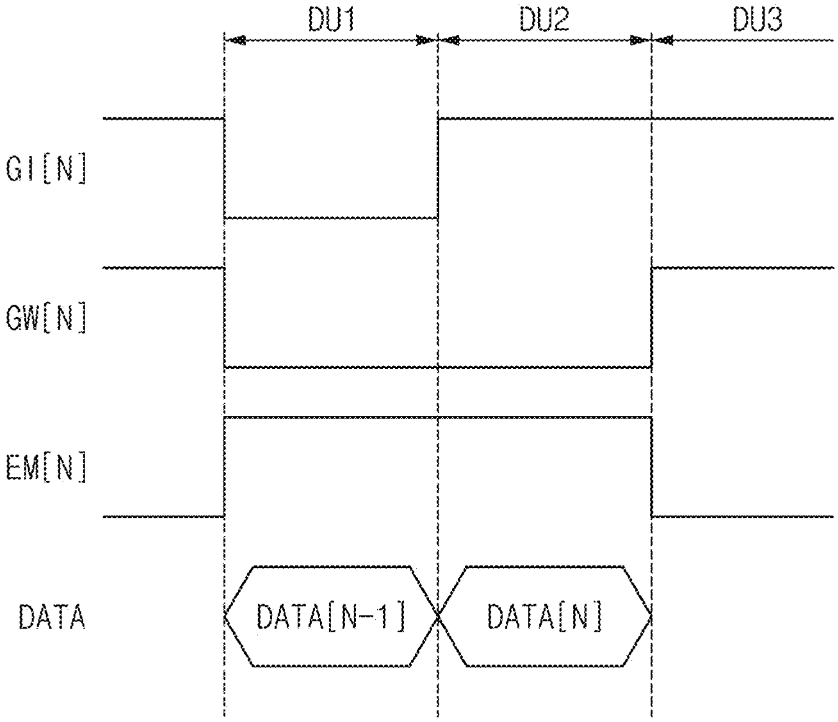
FIG. 9 is a timing diagram illustrating signals applied to a display panel of a display apparatus according to an embodiment of the invention.

FIG. 9 is a timing diagram illustrating signals applied to a display panel of a display apparatus according to an embodiment of the invention.

The display panel and the display apparatus including the display panel according to the embodiment shown in FIG. 9 is substantially the same as the display panel and the display apparatus including the display panel according to the embodiments described above referring to FIGS. 1 to 5 except for signals applied to the display panel. Thus, the same reference numerals will be used to refer to the same or like elements as those described above with reference to FIGS. 1 to 5 and any repetitive detailed description thereof will be omitted.

Referring to FIGS. 1 to 4 and 9, during a first duration DU1, the initialization gate signal GI[N] may be activated, the data writing gate signal GW[N] may be activated and the emission signal EM[N] may be deactivated.

During a second duration DU2, the initialization gate signal GI[N] may be deactivated, the data writing gate signal GW[N] may be activated and the emission signal EM[N] may be deactivated.

During a third duration DU3, the initialization gate signal GI[N] may be deactivated, the data writing gate signal GW[N] may be deactivated and the emission signal EM[N] may be activated.

In an embodiment, the initialization gate signal GI[N] has an active period corresponding to one horizontal period (1H), the data writing gate signal GW[N] has an active period corresponding to two horizontal periods (2H). In such an embodiment, as shown in FIG. 9, an inactive period of the emission signal EM[N] may correspond to three horizontal periods (3H). Alternatively, the inactive period of the emission signal EM[N] may be longer than three horizontal periods 3H.

In an embodiment where the data writing gate signal GW[N] has the active period corresponding to two horizontal periods (2H), the charging time of the data voltage VDATA is increased compared to a case where the data writing gate signal GW[N] has an active period corresponding to one horizontal period (1H) so that the display quality of the display panel 100 may be enhanced.

In an embodiment, a driver for generating the initialization gate signal GI[N] and a driver for generating the data write gate signal GW[N] may be separately provided.

According to an embodiment, the display panel 100 includes the initialization circuit T4 and T7 that simultaneously operates the initialization of the anode electrode of the light emitting element EE of the first pixel PX and the initialization of the gate electrode of the driving transistor T1 of the second pixel PX+1 so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

Figure 10:
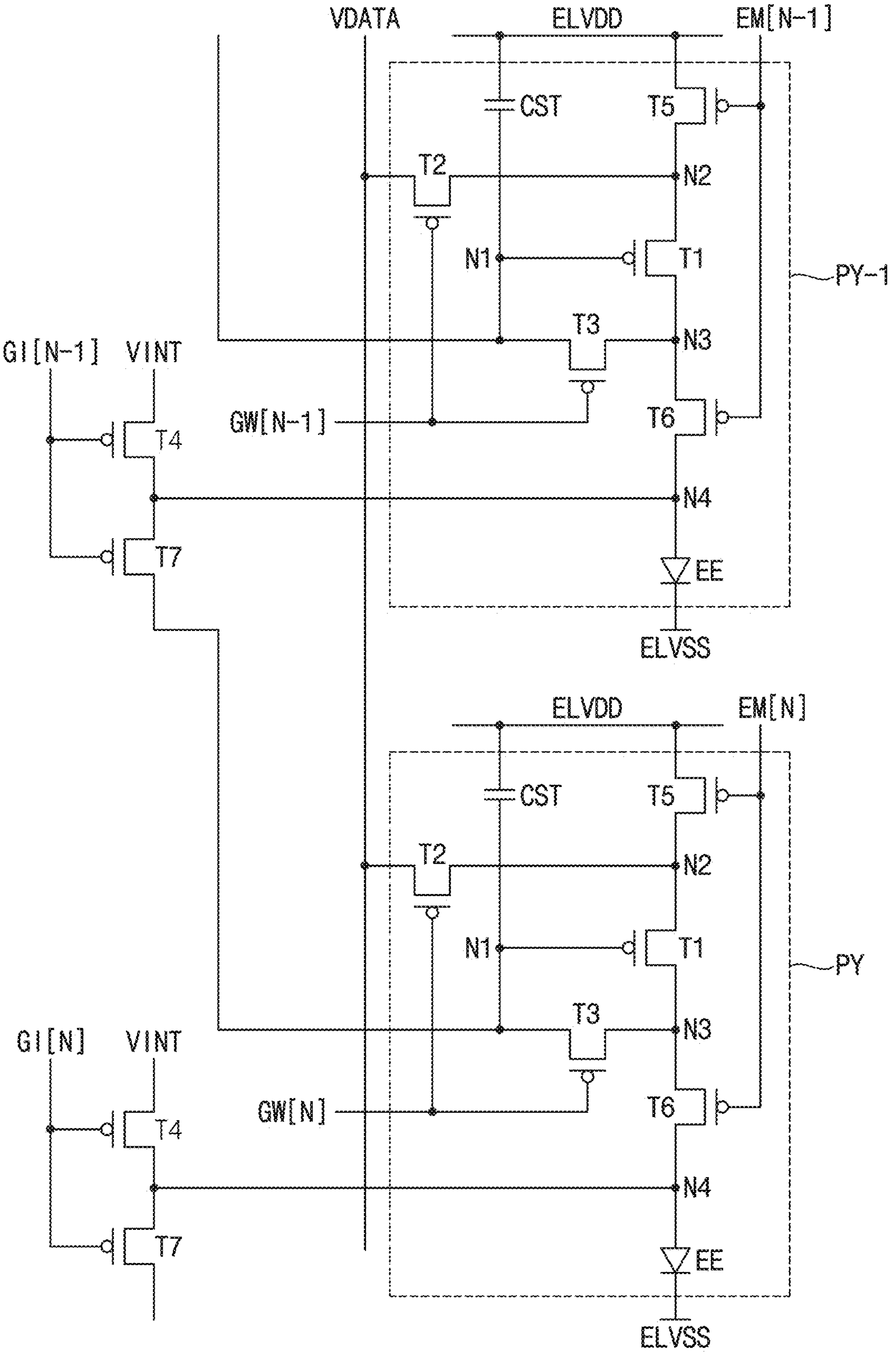
FIG. 10 is a circuit diagram illustrating a portion of a display panel of a display apparatus according to an embodiment of the invention.

FIG. 10 is a circuit diagram illustrating a portion of a display panel of a display apparatus according to an embodiment of the invention.

The display panel and the display apparatus including the display panel according to the embodiment of FIG. 10 is substantially the same as the display panel and the display apparatus including the display panel according to the embodiments described above referring to FIGS. 1 to 5 except that the first pixel circuit and the second pixel circuit are disposed adjacent to each other in a same pixel column. Thus, the same reference numerals will be used to refer to the same or like elements as those described above with reference to FIGS. 1 to 5 and any repetitive detailed description thereof will be omitted.

Referring to FIGS. 1 and 10, in an embodiment, the display panel 100 may include a first pixel circuit PY-1, a second pixel circuit PY and an initialization circuit (T4 and T7 illustrated in a relatively upper portion in FIG. 10) that simultaneously operates an initialization of an anode electrode of a light emitting element EE of the first pixel circuit PY-1 and an initialization of a gate electrode of a driving transistor T1 of the second pixel circuit PY.

An initialization circuit T4 and T7 illustrated in a relatively lower portion in FIG. 10 may initialize an anode electrode of a light emitting element EE of the second pixel circuit PY.

In such an embodiment, as described above, the initialization circuit T4 and T7 connected to two adjacent pixel circuits may initialize the anode electrode of the light emitting element EE of an upper pixel circuit of the two adjacent pixel circuits and may initialize the gate electrode of the gate electrode of the driving transistor T1 of a lower pixel circuit of the two adjacent pixel circuits.

In an embodiment, the first pixel circuit PY-1 and the second pixel circuit PY may be disposed adjacent to each other in a same pixel column.

Figure 11A:
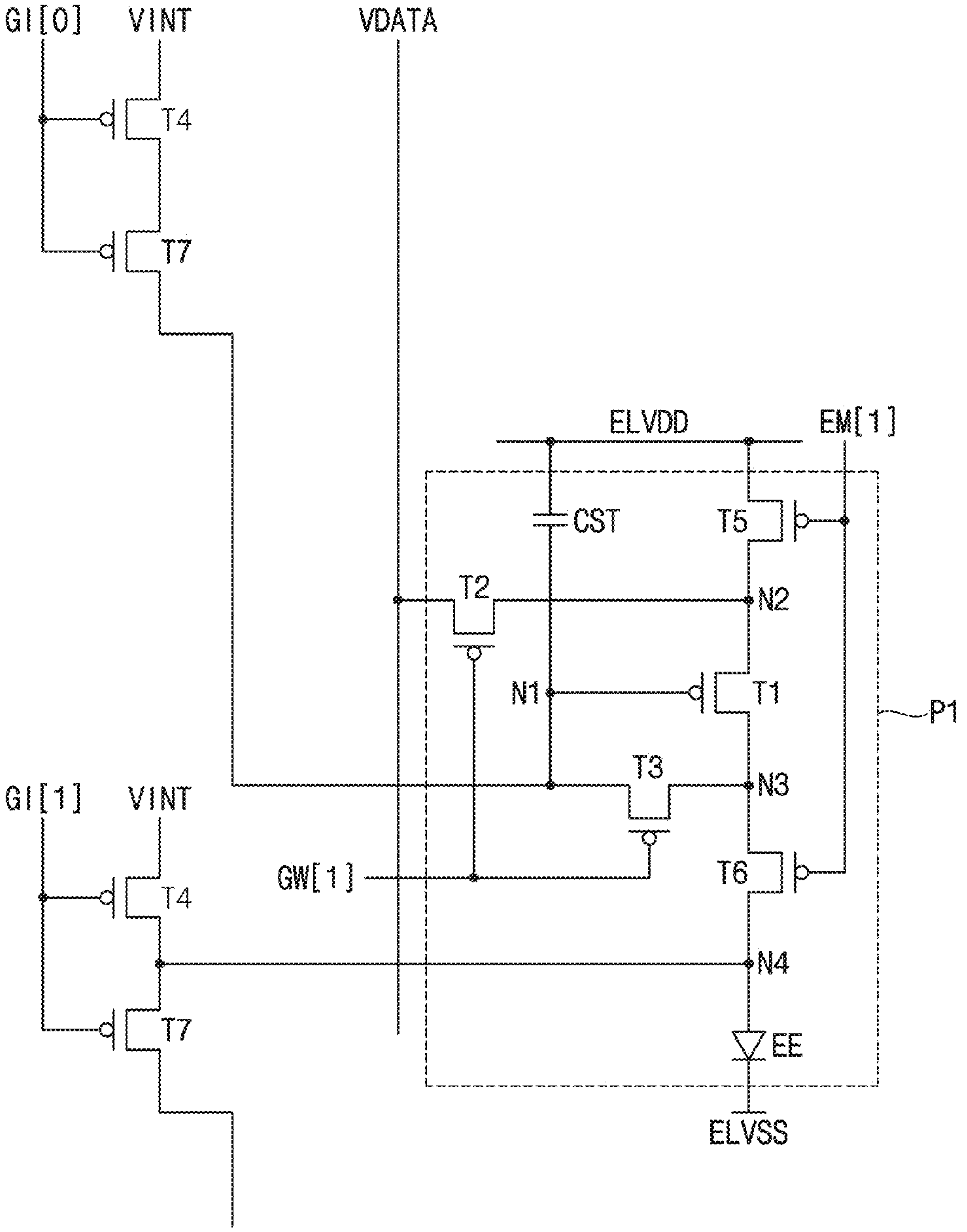
FIG. 11A is a circuit diagram illustrating an embodiment of a first pixel of a pixel column of the display panel of FIG. 10.

FIG. 11A is a circuit diagram illustrating an embodiment of a first pixel of a pixel column of the display panel 100 of FIG. 10.

In an embodiment, as shown in FIG. 10, the first pixel circuit PY-1 and the second pixel circuit PY are disposed in a same pixel column, the first pixel circuit PY-1 has adjacent pixel circuits in both upper and lower sides thereof in the same pixel column and the second pixel circuit PY has adjacent pixel circuits in both upper and lower sides thereof in the same pixel column. FIG. 11A illustrates a first outermost pixel P1 (e.g., an uppermost pixel) and an initialization circuit of the first outermost pixel P1. In an embodiment, for example, the first outermost pixel P1 is an uppermost pixel in the same pixel column so that a pixel does not exist on an upper side of the first outermost pixel P1.

Referring to FIGS. 1, 10 and 11A, the initialization circuit of the first outermost pixel P1 (e.g., an uppermost pixel) disposed in a first end portion in the pixel column may include a first outermost first initialization transistor T7 including a gate electrode that receives a dummy initialization gate signal GI[0], a first electrode connected to a second electrode of a first outermost second initialization transistor T4 and a second electrode connected to a gate electrode of the driving transistor T1 of the first outermost pixel P1 and the first outermost second initialization transistor T4 including a gate electrode that receives the dummy initialization gate signal GI[0], a first electrode that receives the initialization voltage VINT and the second electrode connected to the first electrode of the first outermost first initialization transistor T7.

If the initialization circuit for initializing the first outermost pixel P1 is not provided, a gate electrode of a driving transistor T1 of the first outermost pixel P1 is not initialized. In an embodiment, the initialization circuit is included for initializing the first outermost pixel P1.

Figure 11B:
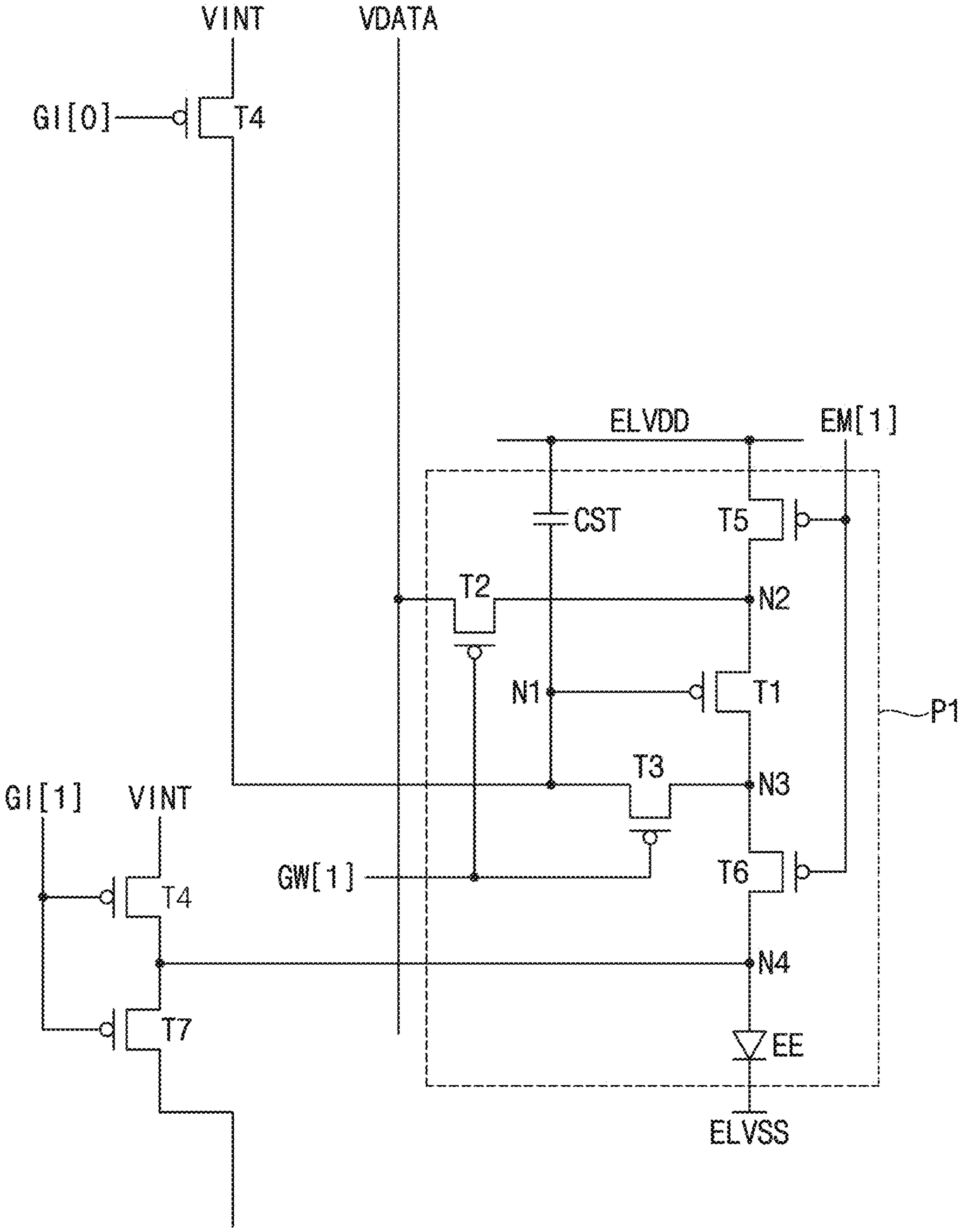
FIG. 11B is a circuit diagram illustrating an alternative embodiment of a first pixel of a pixel column of the display panel of FIG. 10.

FIG. 11B is a circuit diagram illustrating an alternative embodiment of a first pixel of a pixel column of the display panel 100 of FIG. 10.

Referring to FIGS. 1, 10 and 11B, the initialization circuit of the first outermost pixel P1 (e.g., an uppermost pixel) disposed in a first end portion in the pixel column may include a first outermost initialization transistor T4 including a gate electrode that receives a dummy initialization gate signal GI[0], a first electrode that receives the initialization voltage VINT and a second electrode connected to a gate electrode of the driving transistor T1 of the first outermost pixel P1.

If the initialization circuit for initializing the first outermost pixel P1 is not provided, a gate electrode of a driving transistor T1 of the first outermost pixel P1 is not initialized. In an embodiment, the initialization circuit is included for initializing the first outermost pixel P1.

Figure 12:
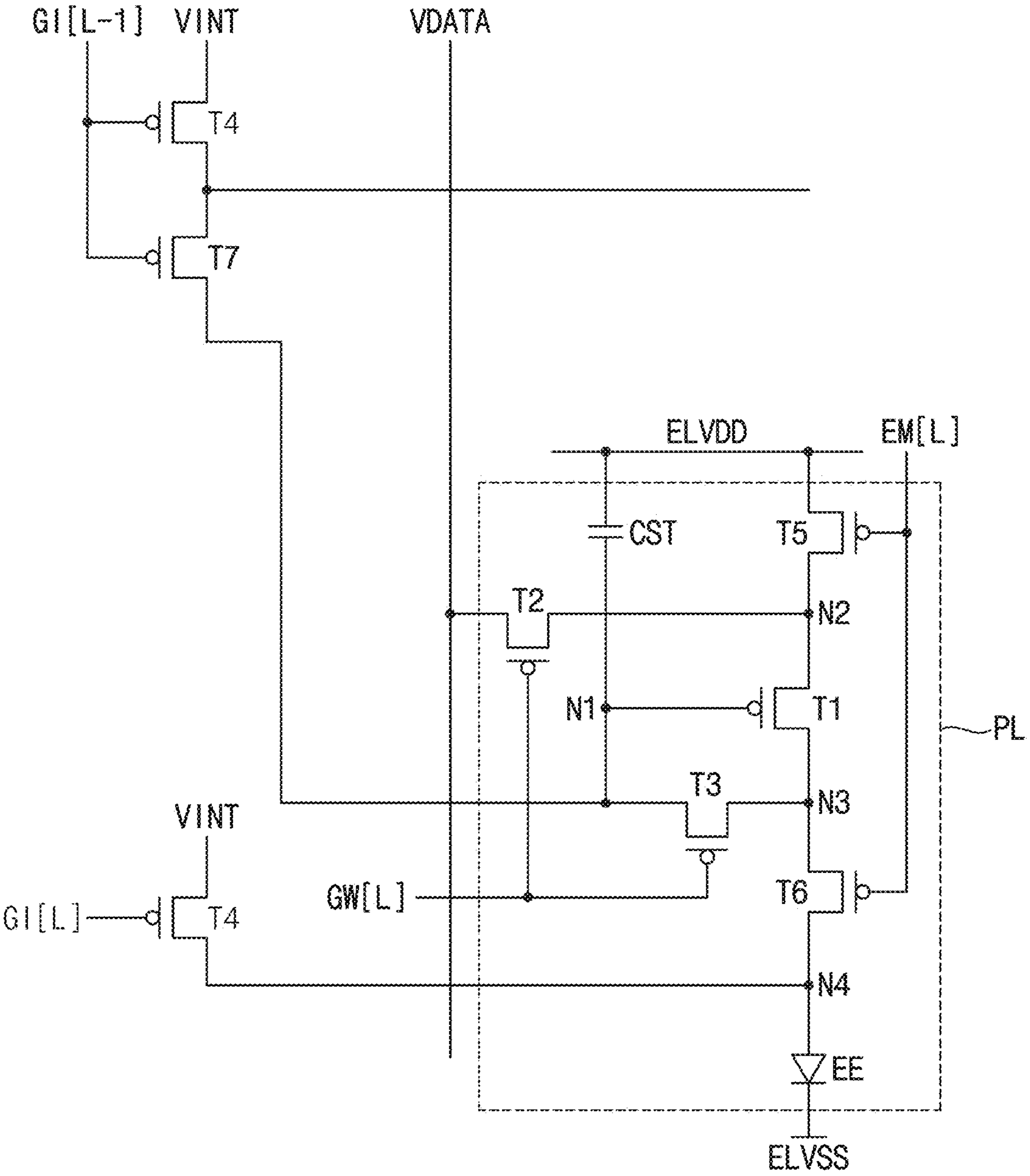
FIG. 12 is a circuit diagram illustrating an embodiment of a last pixel of the pixel column of the display panel of FIG. 10.

FIG. 12 is a circuit diagram illustrating an embodiment of a last pixel of the pixel column of the display panel 100 of FIG. 10.

In an embodiment, as shown in FIG. 10, the first pixel circuit PY-1 and the second pixel circuit PY are disposed in the same pixel column, the first pixel circuit PY-1 has adjacent pixel circuits in both upper and lower sides thereof in the same pixel column and the second pixel circuit PY has adjacent pixel circuits in both upper and lower sides thereof in the same pixel column. FIG. 12 illustrates a second outermost pixel PL (e.g., a lowermost pixel) and an initialization circuit of the second outermost pixel PL. In an embodiment, for example, the second outermost pixel PL is a lowermost pixel in the same pixel column so that a pixel does not exist on a lower side of the second outermost pixel PL.

Referring to FIGS. 1, 10 and 12, the initialization circuit of the second outermost pixel PL (e.g., a lowermost pixel) disposed in a second end portion in the pixel column may include a second outermost initialization transistor T4 including a gate electrode that receives the initialization gate signal GI[L], a first electrode that receives the initialization voltage VINT and a second electrode connected to an anode electrode of a light emitting element EE of the second outermost pixel PL.

If the initialization circuit for initializing the second outermost pixel PL is not provided, the anode electrode of the light emitting element EE of the second outermost pixel PL is not initialized. In an embodiment, the initialization circuit is provided for the second outermost pixel PL.

Figure 13:
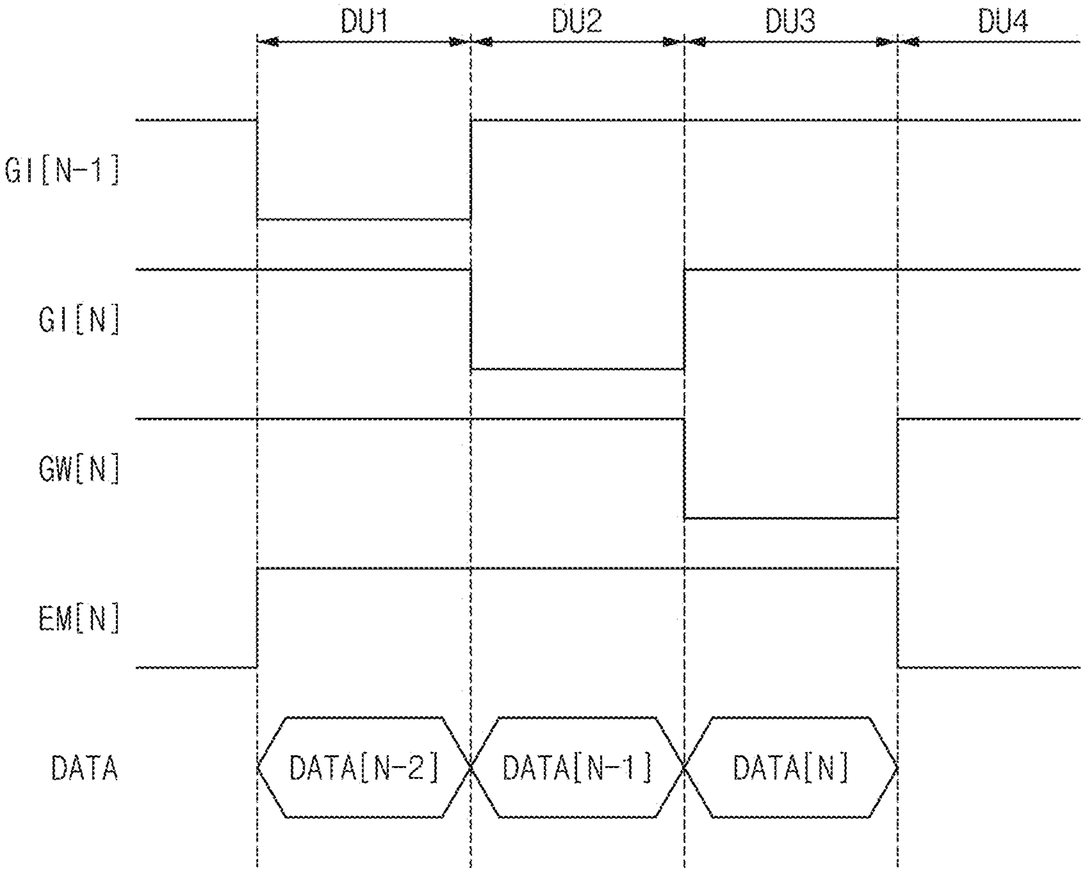
FIG. 13 is a timing diagram illustrating signals applied to the display panel of FIG. 10.

FIG. 13 is a timing diagram illustrating signals applied to the display panel 100 of FIG. 10.

Referring to FIGS. 1 and 10 to 13, during a first duration DU1, a previous pixel initialization gate signal GI[N−1] corresponding to a previous pixel row may be activated, a present pixel initialization gate signal GI[N] corresponding to a present pixel row may be deactivated, a present pixel data writing gate signal GW[N] corresponding to the present pixel row may be deactivated, and a present pixel emission signal EM[N] corresponding to the present pixel row may be deactivated.

During a second duration DU2, the previous pixel initialization gate signal GI[N−1] may be deactivated, the present pixel initialization gate signal GI[N] may be activated, the present pixel data writing gate signal GW[N] may be deactivated, and the present pixel emission signal EM[N] may be deactivated.

During a third duration DU3, the previous pixel initialization gate signal GI[N−1] may be deactivated, the present pixel initialization gate signal GI[N] may be deactivated, the present pixel data writing gate signal GW[N] may be activated, and the present pixel emission signal EM[N] may be deactivated.

During a fourth duration DU4, the previous pixel initialization gate signal GI[N−1] may be deactivated, the present pixel initialization gate signal GI[N] may be deactivated, the present pixel data writing gate signal GW[N] may be deactivated, and the present pixel emission signal EM[N] may be activated.

During the first duration DU1, the data signal DATA may have a second previous data signal DATA[N−2], during the second duration DU2, the data signal DATA may have a first previous data signal DATA[N−1] and during the third duration DU3, the data signal DATA may have a present data signal DATA[N].

In an embodiment, the initialization gate signal GI[N] has an active period corresponding to one horizontal period (1H), the data writing gate signal GW[N] has an active period corresponding to one horizontal period (1H) and the active period of the initialization gate signal GI[N] and the active period of the data writing gate signal GW[N] may not overlap each other. In such an embodiment, as shown in FIG. 13, an inactive period of the emission signal EM[N] may correspond to three horizontal periods (3H). Alternatively, the inactive period of the emission signal EM[N] may be longer than three horizontal periods (3H).

In an embodiment, a driver for generating the initialization gate signal GI[N] and a driver for generating the data write gate signal GW[N] may be separately provided.

According to an embodiment, the display panel 100 includes the initialization circuit T4 and T7 that simultaneously operates the initialization of the anode electrode of the light emitting element EE of the first pixel PY-1 and the initialization of the gate electrode of the driving transistor T1 of the second pixel PY so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

Figure 14:
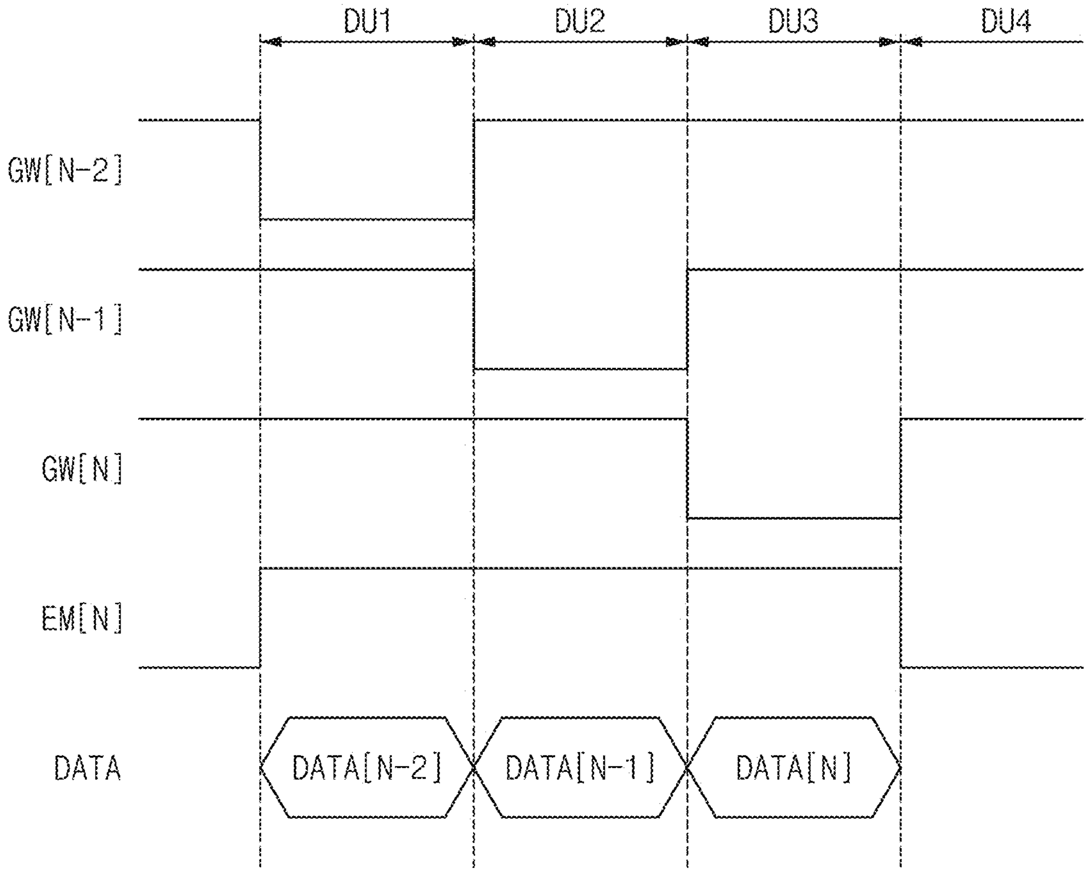
FIG. 14 is a timing diagram illustrating signals applied to a display panel of a display apparatus according to an embodiment of the invention.

FIG. 14 is a timing diagram illustrating signals applied to a display panel 100 of a display apparatus according to an embodiment of the invention.

The display panel and the display apparatus including the display panel according to the embodiment of FIG. 14 is substantially the same as the display panel and the display apparatus including the display panel according to the embodiments described above referring to FIGS. 10 to 13 except for signals applied to the display panel. Thus, the same reference numerals will be used to refer to the same or like elements as those described above with reference to FIGS. 10 to 13 and any repetitive detailed description thereof will be omitted.

Referring to FIGS. 10 to 12 and 14, in an embodiment, the initialization gate signal GI[N] corresponding to an N-th pixel row may be the data writing gate signal GW[N−1] corresponding to an (N−1)-th pixel row. Herein, N is a natural number greater than two.

In an embodiment, a driver for generating the initialization gate signal GW[N−1] and a driver for generating the data write gate signal GW[N] may be integrally formed with each other as one chip. In an embodiment, for example, the driver of the initialization gate signal GW[N−1] and the driver of the data writing gate signal GW[N] may be a same driver. In an embodiment, for example, a previous data write gate signal GW[N−1] is used as the initialization gate signal GW[N−1] so that the initialization gate signal GW[N−1] and the data write gate signal GW[N] may be generated from the same driver.

According to an embodiment, the display panel 100 includes the initialization circuit T4 and T7 that simultaneously operates the initialization of the anode electrode of the light emitting element EE of the first pixel PY-1 and the initialization of the gate electrode of the driving transistor T1 of the second pixel PY so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

In such an embodiment, the driver of the initialization gate signal GW[N−1] and the driver of the data writing gate signal GW[N] may be integrally formed with each other as one chip so that the manufacturing cost may be reduced and the dead space may be reduced.

Figure 15:
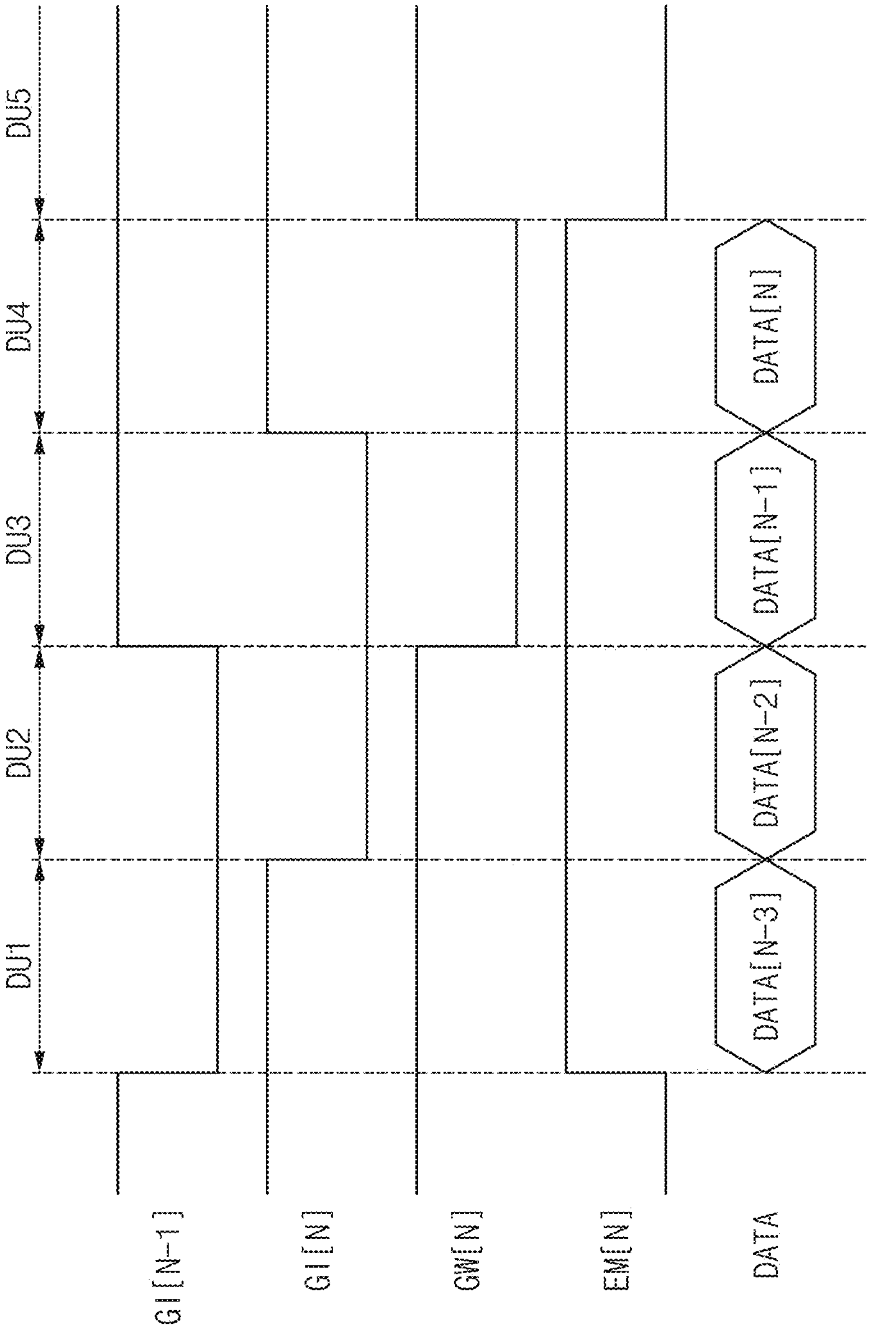
FIG. 15 is a timing diagram illustrating signals applied to a display panel of a display apparatus according to an embodiment of the invention.

FIG. 15 is a timing diagram illustrating signals applied to a display panel 100 of a display apparatus according to an embodiment of the invention.

The display panel and the display apparatus including the display panel according to the embodiment of FIG. 15 is substantially the same as the display panel and the display apparatus including the display panel according to the embodiments described above referring to FIGS. 10 to 13 except for signals applied to the display panel. Thus, the same reference numerals will be used to refer to the same or like elements as those described above with reference to FIGS. 10 to 13 and any repetitive detailed description thereof will be omitted.

Referring to FIGS. 10 to 12 and 15, during a first duration DU1, a previous pixel initialization gate signal GI[N−1] corresponding to a previous pixel row may be activated, a present pixel initialization gate signal GI[N] corresponding to a present pixel row may be deactivated, a present pixel data writing gate signal GW[N] corresponding to the present pixel row may be deactivated and a present pixel emission signal EM[N] corresponding to the present pixel row may be deactivated.

During a second duration DU2, the previous pixel initialization gate signal GI[N−1] may be activated, the present pixel initialization gate signal GI[N] may be activated, the present pixel data writing gate signal GW[N] may be deactivated and the present pixel emission signal EM[N] may be deactivated.

During a third duration DU3, the previous pixel initialization gate signal GI[N−1] may be deactivated, the present pixel initialization gate signal GI[N] may be activated, the present pixel data writing gate signal GW[N] may be activated and the present pixel emission signal EM[N] may be deactivated.

During a fourth duration DU4, the previous pixel initialization gate signal GI[N−1] may be deactivated, the present pixel initialization gate signal GI[N] may be deactivated, the present pixel data writing gate signal GW[N] may be activated and the present pixel emission signal EM[N] may be deactivated.

During a fifth duration DU5, the previous pixel initialization gate signal GI[N−1] may be deactivated, the present pixel initialization gate signal GI[N] may be deactivated, the present pixel data writing gate signal GW[N] may be deactivated and the present pixel emission signal EM[N] may be activated.

In an embodiment, the initialization gate signal GI[N] has an active period corresponding to two horizontal periods (2H), the data writing gate signal GW[N] has an active period corresponding to two horizontal periods (2H) and the active period of the initialization gate signal GI[N] and the active period of the data writing gate signal GW[N] overlap each other for one horizontal period (1H). In such an embodiment, as shown in FIG. 15, an inactive period of the emission signal EM[N] may correspond to four horizontal periods (4H). Alternatively, the inactive period of the emission signal EM[N] may be longer than four horizontal periods (4H).

In an embodiment, a driver for generating the initialization gate signal GI[N] and a driver for generating the data write gate signal GW[N] may be separately provided.

According to an embodiment, the display panel 100 includes the initialization circuit T4 and T7 that simultaneously operates the initialization of the anode electrode of the light emitting element EE of the first pixel PY-1 and the initialization of the gate electrode of the driving transistor T1 of the second pixel PY so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

Figure 16:
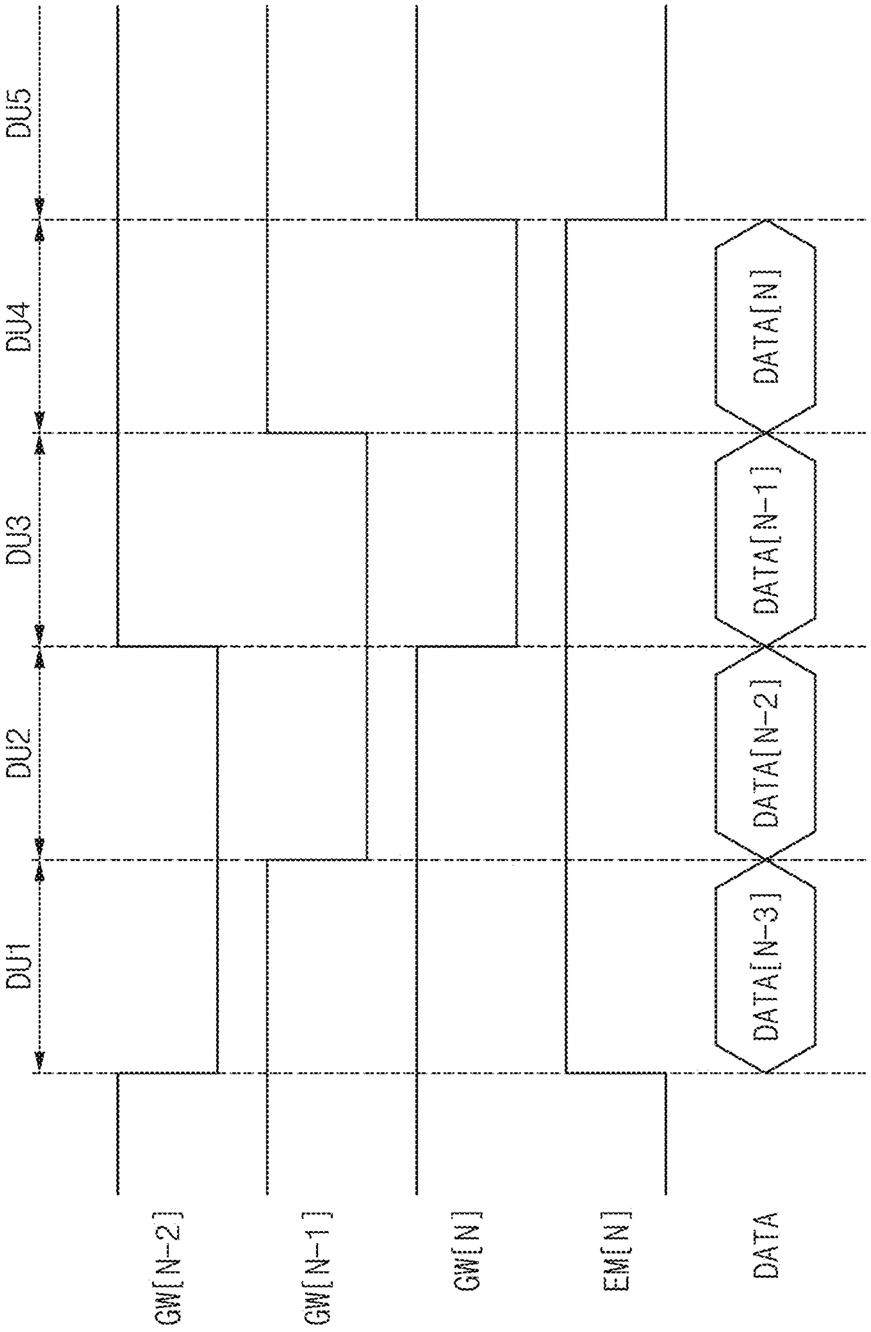
FIG. 16 is a timing diagram illustrating signals applied to a display panel of a display apparatus according to an embodiment of the invention.

FIG. 16 is a timing diagram illustrating signals applied to a display panel 100 of a display apparatus according to an embodiment of the invention.

The display panel and the display apparatus including the display panel according to the embodiment of FIG. 16 is substantially the same as the display panel and the display apparatus including the display panel according to the embodiment described above referring to FIG. 15 except for signals applied to the display panel. Thus, the same reference numerals will be used to refer to the same or like elements as those described above with reference to FIG. 15 and any repetitive detailed description thereof will be omitted.

Referring to FIGS. 10 to 12, 15 and 16, in an embodiment, the initialization gate signal GI[N] corresponding to an N-th pixel row may be the data writing gate signal GW[N−1] corresponding to an (N−1)-th pixel row. Herein, N is a natural number greater than two.

In an embodiment, a driver for generating the initialization gate signal GW[N−1] and a driver for generating the data write gate signal GW[N] may be integrally formed with each other as one driver. In an embodiment, for example, the driver of the initialization gate signal GW[N−1] and the driver of the data writing gate signal GW[N] may be a same driver. In an embodiment, for example, a previous data write gate signal GW[N−1] is used as the initialization gate signal GW[N−1] so that the initialization gate signal GW[N−1] and the data write gate signal GW[N] may be generated from the same driver.

According to an embodiment, the display panel 100 includes the initialization circuit T4 and T7 that simultaneously operates the initialization of the anode electrode of the light emitting element EE of the first pixel PY-1 and the initialization of the gate electrode of the driving transistor T1 of the second pixel PY so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

In such an embodiment, the driver of the initialization gate signal GW[N−1] and the driver of the data writing gate signal GW[N] may be integrally formed with each other as one chip so that the manufacturing cost may be reduced and the dead space may be reduced.

Figure 17:
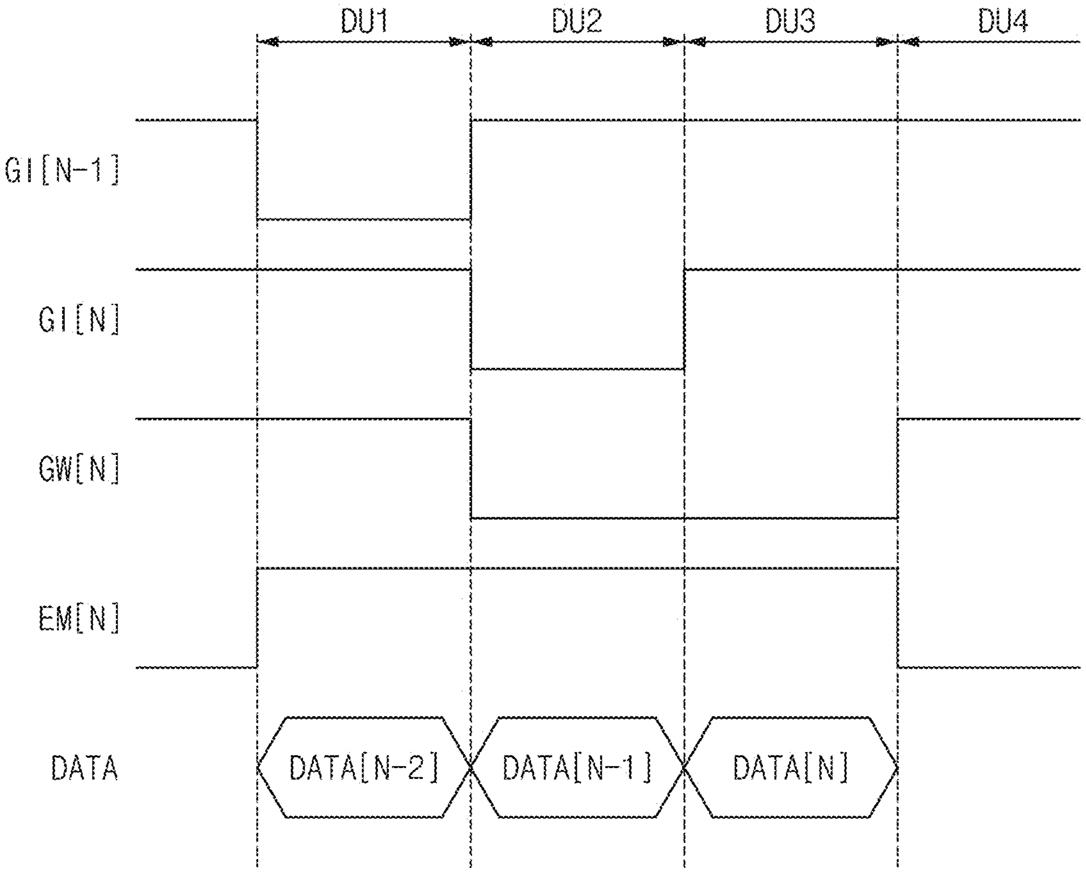
FIG. 17 is a circuit diagram illustrating a portion of a display panel of a display apparatus according to an embodiment of the invention.

FIG. 17 is a circuit diagram illustrating a portion of a display panel 100 of a display apparatus according to an embodiment of the invention.

The display panel and the display apparatus including the display panel according to the embodiment of FIG. 17 is substantially the same as the display panel and the display apparatus including the display panel according to the embodiments described above referring to FIGS. 10 to 13 except for signals applied to the display panel. Thus, the same reference numerals will be used to refer to the same or like elements as those described above with reference to FIGS. 10 to 13 and any repetitive detailed description thereof will be omitted.

Referring to FIGS. 10 to 12 and 17, during a first duration DU1, a previous pixel initialization gate signal GI[N−1] corresponding to a previous pixel row may be activated, a present pixel initialization gate signal GI[N] corresponding to a present pixel row may be deactivated, a present pixel data writing gate signal GW[N] corresponding to the present pixel row may be deactivated and a present pixel emission signal EM[N] corresponding to the present pixel row may be deactivated.

During a second duration DU2, the previous pixel initialization gate signal GI[N−1] may be deactivated, the present pixel initialization gate signal GI[N] may be activated, the present pixel data writing gate signal GW[N] may be activated and the present pixel emission signal EM[N] may be deactivated.

During a third duration DU3, the previous pixel initialization gate signal GI[N−1] may be deactivated, the present pixel initialization gate signal GI[N] may be deactivated, the present pixel data writing gate signal GW[N] may be activated and the present pixel emission signal EM[N] may be deactivated.

In an embodiment, the initialization gate signal GI[N] has an active period corresponding to one horizontal period (1H), the data writing gate signal GW[N] has an active period corresponding to two horizontal periods (2H). In an embodiment where the data writing gate signal GW[N] has the active period corresponding to two horizontal periods (2H), the charging time of the data voltage VDATA is increased compared to a case where the data writing gate signal GW[N] has an active period corresponding to one horizontal period (1H) so that the display quality of the display panel 100 may be enhanced.

According to an embodiment, the display panel 100 includes the initialization circuit T4 and T7 that simultaneously operates the initialization of the anode electrode of the light emitting element EE of the first pixel PY-1 and the initialization of the gate electrode of the driving transistor T1 of the second pixel PY so that the leakage of the gate electrode of the driving transistor T1 may be effectively prevented. Thus, the flicker in the low frequency driving mode may be effectively prevented and the bright spot defect due to the luminance difference between pixels may be effectively prevented. Accordingly, in such an embodiment, the display quality of the display panel 100 may be enhanced.

Figure 18:
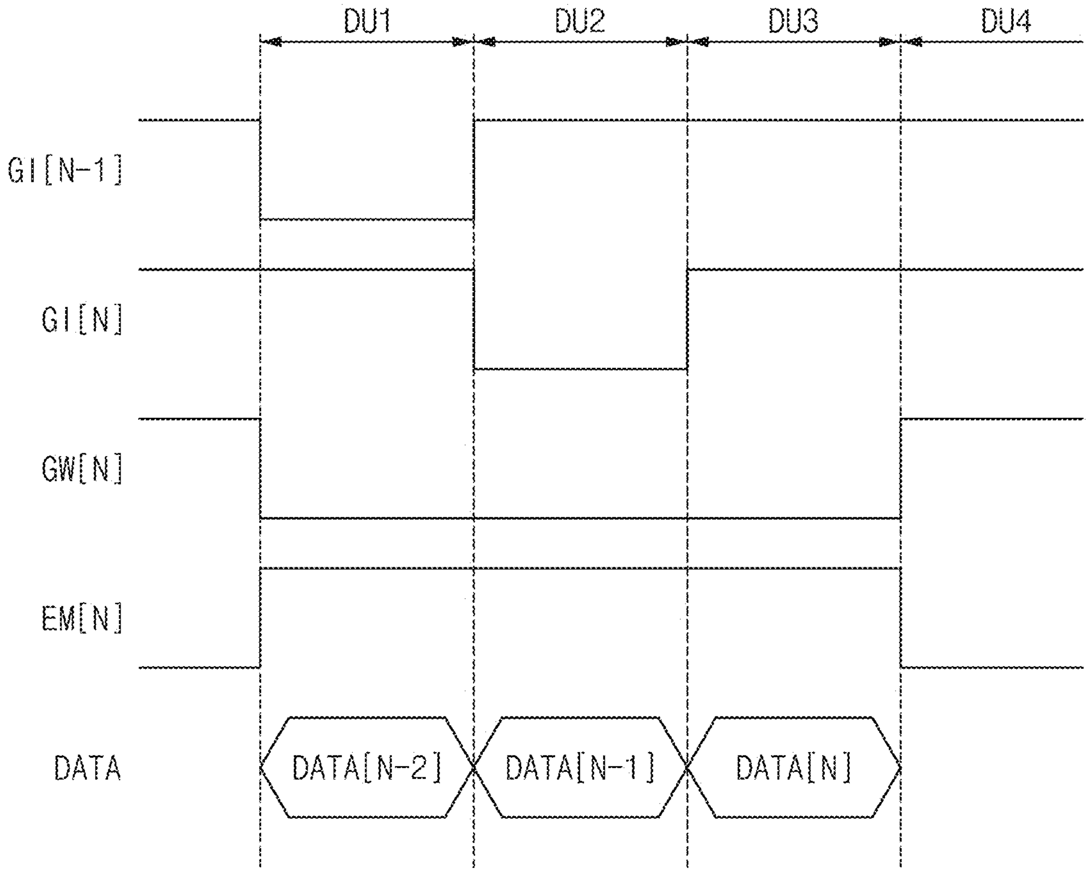
FIG. 18 is a circuit diagram illustrating a portion of a display panel of a display apparatus according to an embodiment of the invention.

FIG. 18 is a circuit diagram illustrating a portion of a display panel 100 of a display apparatus according to an embodiment of the invention.

The display panel and the display apparatus including the display panel according to the embodiment of FIG. 18 is substantially the same as the display panel and the display apparatus including the display panel according to the embodiments described above referring to FIGS. 10 to 13 except for signals applied to the display panel. Thus, the same reference numerals will be used to refer to the same or like elements as those described above with reference to FIGS. 10 to 13 and any repetitive detailed description thereof will be omitted.

Referring to FIGS. 10 to 12 and 18, during a first duration DU1, a previous pixel initialization gate signal GI[N−1] corresponding to a previous pixel row may be activated, a present pixel initialization gate signal GI[N] corresponding to a present pixel row may be deactivated, a present pixel data writing gate signal GW[N] corresponding to the present pixel row may be activated and a present pixel emission signal EM[N] corresponding to the present pixel row may be deactivated.

During a second duration DU2, the previous pixel initialization gate signal GI[N−1] may be deactivated, the present pixel initialization gate signal GI[N] may be activated, the present pixel data writing gate signal GW[N] may be activated and the present pixel emission signal EM[N] may be deactivated.

During a third duration DU3, the previous pixel initialization gate signal GI[N−1] may be deactivated, the present pixel initialization gate signal GI[N] may be deactivated, the present pixel data writing gate signal GW[N] may be activated and the present pixel emission signal EM[N] may be deactivated.

In an embodiment, the initialization gate signal GI[N] has an active period corresponding to one horizontal period (1H), the data writing gate signal GW[N] has an active period corresponding to three horizontal periods (3H). In an embodiment where the data writing gate signal GW[N] has the active period corresponding to three horizontal periods (3H), the charging time of the data voltage VDATA is increased compared to a case where the data writing gate signal GW[N] has an active period corresponding to one horizontal period (1H) so that the display quality of the display panel 100 may be enhanced.

According to an embodiment, the display panel 100 includes the initialization circuit T4 and T7 that simultaneously operates the initialization of the anode electrode of the light emitting element EE of the first pixel PY-1 and the initialization of the gate electrode of the driving transistor T1 of the second pixel PY so that the leakage of the gate electrode of the driving transistor T1 may be effectively prevented. Thus, the flicker in the low frequency driving mode may be effectively prevented and the bright spot defect due to the luminance difference between pixels may be effectively prevented. Thus, the display quality of the display panel 100 may be enhanced.

Figure 19:
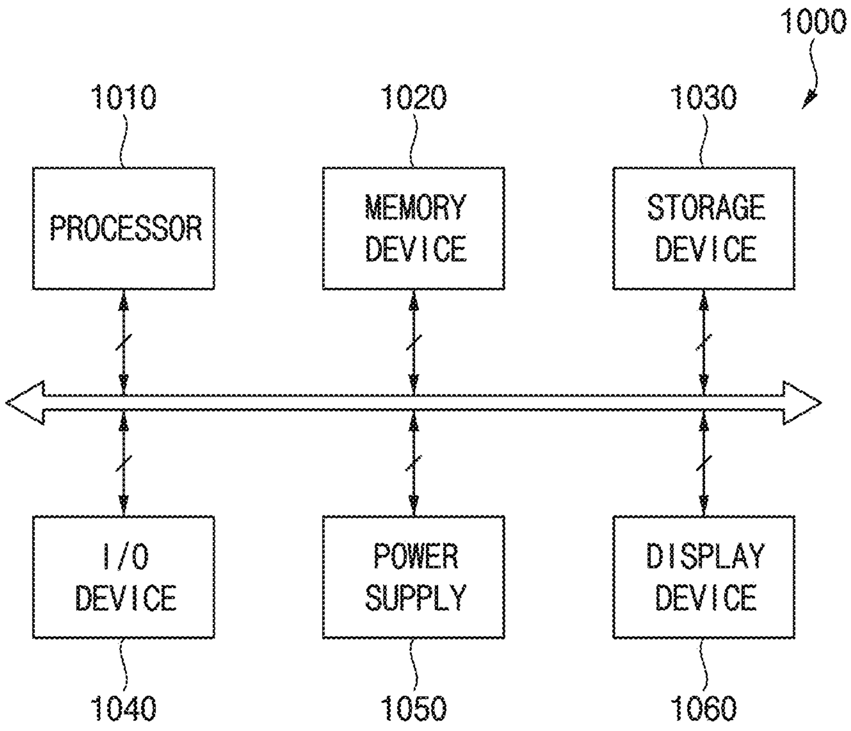
FIG. 19 is a block diagram illustrating an electronic apparatus according to an embodiment of the invention.
Figure 20:
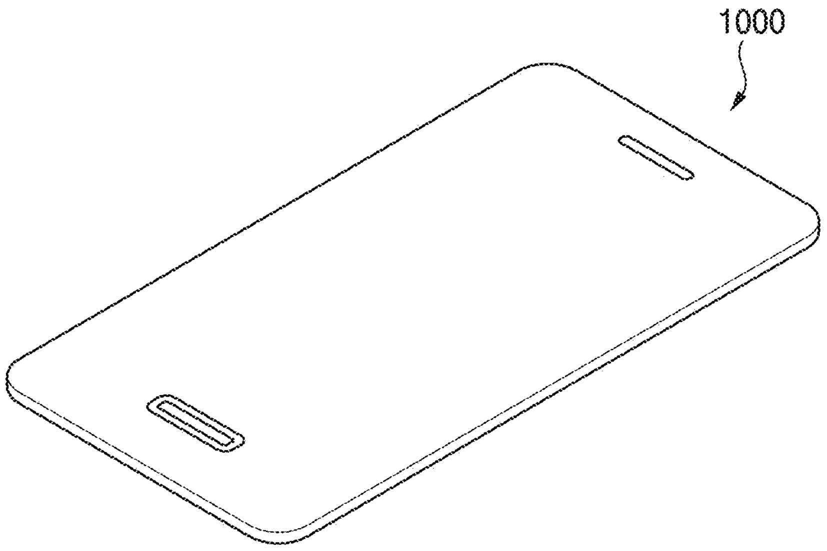
FIG. 20 is a diagram illustrating an embodiment in which the electronic apparatus of FIG. 19 is implemented as a smart phone.

FIG. 19 is a block diagram illustrating an electronic apparatus according to an embodiment of the invention. FIG. 20 is a diagram illustrating an embodiment in which the electronic apparatus of FIG. 19 is implemented as a smart phone.

Referring to FIGS. 19 and 20, an embodiment of the electronic device (the electronic apparatus) 1000 may include a processor 1010, a memory device 1020, a storage device 1030, an input/output (I/O) device 1040, a power supply 1050, and a display device (the display apparatus) 1060. Here, the display device 1060 may correspond to the display apparatus of FIG. 1. In addition, the electronic device 1000 may further include a plurality of ports for communicating with a video card, a sound card, a memory card, a universal serial bus (USB) device, other electronic devices, etc.

In an embodiment, as illustrated in FIG. 20, the electronic device 1000 may be implemented as a smart phone. However, the electronic device 1000 is not limited thereto. In an alternative embodiment, for example, the electronic device 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions or tasks. The processor 1010 may be a microprocessor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, or the like and an output device such as a printer, a speaker, or the like. In some embodiments, the display device 1060 may be included in the I/O device 1040. The power supply 1050 may provide power for operations of the electronic device 1000. The display device 1060 may be coupled to other components via the buses or other communication links.

According to embodiments of the invention as described above, the display quality of the display panel may be enhanced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel comprising:

a first pixel circuit including a first pixel light emitting element, a first pixel driving transistor which applies a first pixel driving current to the first pixel light emitting element and a first pixel writing transistor which applies a first pixel data voltage to the first pixel driving transistor in response to a data writing gate signal;

a second pixel circuit disposed adjacent to the first pixel circuit, wherein the second pixel circuit includes a second pixel light emitting element, a second pixel driving transistor which applies a second pixel driving current to the second pixel light emitting element and a second pixel writing transistor which applies a second pixel data voltage to the second pixel driving transistor in response to the data writing gate signal;

a first initialization transistor including a gate electrode which receives an initialization gate signal, a first electrode connected to an anode electrode of the first pixel light emitting element and a second electrode connected to a gate electrode of the second pixel driving transistor; and a second initialization transistor including a gate electrode which receives the initialization gate signal, a first electrode which receives an initialization voltage and a second electrode connected to the first electrode of the first initialization transistor, wherein a duration of an active period of the initialization gate signal is shorter than a duration of an active period of the data writing gate signal.

2. The display panel of claim 1, wherein the first pixel driving transistor includes a gate electrode connected to a first pixel first node, a first electrode connected to a first pixel second node and a second electrode connected to a first pixel third node, wherein the first pixel writing transistor includes a gate electrode which receives the data writing gate signal, a first electrode which receives the first pixel data voltage and a second electrode connected to the first pixel second node, wherein the first pixel light emitting element includes the anode electrode connected to a first pixel fourth node and a cathode electrode which receives a second power voltage, and wherein the first pixel circuit further includes:

a first pixel compensation transistor including a gate electrode which receives the data writing gate signal, a first electrode connected to the first pixel first node and a second electrode connected to the first pixel third node;

a first pixel first emission transistor including a gate electrode which receives an emission signal, a first electrode which receives a first power voltage and a second electrode connected to the first pixel second node; and a first pixel second emission transistor including a gate electrode which receives the emission signal, a first electrode connected to the first pixel third node and a second electrode connected to the first pixel fourth node.

3. The display panel of claim 2, wherein the second pixel driving transistor includes the gate electrode connected to a second pixel first node, a first electrode connected to a second pixel second node and a second electrode connected to a second pixel third node, wherein the second pixel writing transistor includes a gate electrode which receives the data writing gate signal, a first electrode which receives the second pixel data voltage and a second electrode connected to the second pixel second node, wherein the second pixel light emitting element includes an anode electrode connected to a second pixel fourth node and a cathode electrode which receives the second power voltage, and wherein the second pixel circuit further includes:

a second pixel compensation transistor including a gate electrode which receives the data writing gate signal, a first electrode connected to the second pixel first node and a second electrode connected to the second pixel third node;

a second pixel first emission transistor including a gate electrode which receives the emission signal, a first electrode which receives the first power voltage and a second electrode connected to the second pixel second node; and a second pixel second emission transistor including a gate electrode which receives the emission signal, a first electrode connected to the second pixel third node and a second electrode connected to the second pixel fourth node.

4. The display panel of claim 1, wherein the first pixel circuit and the second pixel circuit are disposed adjacent to each other in a same pixel row.

5. The display panel of claim 4, further comprising:

an initialization circuit of a first outermost pixel disposed in a first end portion in the same pixel row, wherein the initialization circuit of the first outermost pixel includes:

a first outermost first initialization transistor including a gate electrode which receives the initialization gate signal, a first electrode connected to a second electrode of a first outermost second initialization transistor and a second electrode connected to a gate electrode of a driving transistor of the first outermost pixel; and the first outermost second initialization transistor including a gate electrode which receives the initialization gate signal, a first electrode which receives the initialization voltage and the second electrode connected to the first electrode of the first outermost first initialization transistor.

6. The display panel of claim 4, further comprising:

an initialization circuit of a first outermost pixel disposed in a first end portion in the same pixel row, wherein the initialization circuit of the first outermost pixel includes:

a first outermost initialization transistor including a gate electrode which receives the initialization gate signal, a first electrode which receives the initialization voltage and a second electrode connected to a gate electrode of a driving transistor of the first outermost pixel.

7. The display panel of claim 5, further comprising:

an initialization circuit of a second outermost pixel disposed in a second end portion in the same pixel row, wherein the initialization circuit of the second outermost pixel includes:

a second outermost initialization transistor including a gate electrode which receives the initialization gate signal, a first electrode which receives the initialization voltage and a second electrode connected to an anode electrode of a light emitting element of the second outermost pixel.

8. The display panel of claim 1, wherein during a first duration, the initialization gate signal is activated, the data writing gate signal applied to the first pixel writing transistor is activated and an emission signal applied to the first pixel circuit to turn on the first pixel light emitting element is deactivated, and wherein during a second duration, the initialization gate signal is deactivated, the data writing gate signal is activated and the emission signal is deactivated.

9. A display panel comprising:

a first pixel circuit including a first pixel light emitting element, a first pixel driving transistor which applies a first pixel driving current to the first pixel light emitting element and a first pixel writing transistor which applies a first pixel data voltage to the first pixel driving transistor;

a second pixel circuit disposed adjacent to the first pixel circuit, wherein the second pixel circuit includes a second pixel light emitting element, a second pixel driving transistor which applies a second pixel driving current to the second pixel light emitting element and a second pixel writing transistor which applies a second pixel data voltage to the second pixel driving transistor; and a first initialization transistor including a gate electrode which receives an initialization gate signal, a first electrode connected to an anode electrode of the first pixel light emitting element and a second electrode connected to a gate electrode of the second pixel driving transistor, wherein the first electrode of the first initialization transistor is a source electrode, and the second electrode of the first initialization transistor is a drain electrode, wherein the first pixel circuit and the second pixel circuit are disposed adjacent to each other in a same pixel column, and connected to a same data line, and wherein the display panel further comprises an initialization circuit of a first outermost pixel disposed in a first end portion in the same pixel column, wherein the initialization circuit of the first outermost pixel includes:

a first outermost first initialization transistor including a gate electrode which receives a dummy initialization gate signal, a first electrode connected to a second electrode of a first outermost second initialization transistor and a second electrode connected to a gate electrode of a driving transistor of the first outermost pixel; and the first outermost second initialization transistor including a gate electrode which receives the dummy initialization gate signal, a first electrode which receives an initialization voltage and the second electrode connected to the first electrode of the first outermost first initialization transistor.

10. The display panel of claim 9, further comprising:

an initialization circuit of a second outermost pixel disposed in a second end portion in the same pixel column, wherein the initialization circuit of the second outermost pixel includes:

a second outermost initialization transistor including a gate electrode which receives the initialization gate signal, a first electrode which receives the initialization voltage and a second electrode connected to an anode electrode of a light emitting element of the second outermost pixel.

11. The display panel of claim 9, wherein during a first duration, a previous pixel initialization gate signal corresponding to a previous pixel row is activated, a present pixel initialization gate signal corresponding to a present pixel row is deactivated, a present pixel data writing gate signal corresponding to the present pixel row is deactivated and a present pixel emission signal corresponding to the present pixel row is deactivated, wherein during a second duration, the previous pixel initialization gate signal is deactivated, the present pixel initialization gate signal is activated, the present pixel data writing gate signal is deactivated and the present pixel emission signal is deactivated, and wherein during a third duration, the previous pixel initialization gate signal is deactivated, the present pixel initialization gate signal is deactivated, the present pixel data writing gate signal is activated and the present pixel emission signal is deactivated.

12. The display panel of claim 11, wherein the initialization gate signal corresponding to an N-th pixel row is the data writing gate signal corresponding to an (N−1)-th pixel row, wherein N is a natural number greater than one.

13. The display panel of claim 9, wherein during a first duration, a previous pixel initialization gate signal corresponding to a previous pixel row is activated, a present pixel initialization gate signal corresponding to a present pixel row is deactivated, a present pixel data writing gate signal corresponding to the present pixel row is deactivated and a present pixel emission signal corresponding to the present pixel row is deactivated, wherein during a second duration, the previous pixel initialization gate signal is activated, the present pixel initialization gate signal is activated, the present pixel data writing gate signal is deactivated and the present pixel emission signal is deactivated, wherein during a third duration, the previous pixel initialization gate signal is deactivated, the present pixel initialization gate signal is activated, the present pixel data writing gate signal is activated and the present pixel emission signal is deactivated, and wherein during a fourth duration, the previous pixel initialization gate signal is deactivated, the present pixel initialization gate signal is deactivated, the present pixel data writing gate signal is activated and the present pixel emission signal is deactivated.

14. The display panel of claim 13, wherein the initialization gate signal corresponding to an N-th pixel row is the data writing gate signal corresponding to an (N−1)-th pixel row, wherein N is a natural number greater than one.

15. The display panel of claim 9, wherein during a first duration, a previous pixel initialization gate signal corresponding to a previous pixel row is activated, a present pixel initialization gate signal corresponding to a present pixel row is deactivated, a present pixel data writing gate signal corresponding to the present pixel row is deactivated and a present pixel emission signal corresponding to the present pixel row is deactivated, wherein during a second duration, the previous pixel initialization gate signal is deactivated, the present pixel initialization gate signal is activated, the present pixel data writing gate signal is activated and the present pixel emission signal is deactivated, and wherein during a third duration, the previous pixel initialization gate signal is deactivated, the present pixel initialization gate signal is deactivated, the present pixel data writing gate signal is activated and the present pixel emission signal is deactivated.

16. The display panel of claim 9, wherein during a first duration, a previous pixel initialization gate signal corresponding to a previous pixel row is activated, a present pixel initialization gate signal corresponding to a present pixel row is deactivated, a present pixel data writing gate signal corresponding to the present pixel row is activated and a present pixel emission signal corresponding to the present pixel row is deactivated, wherein during a second duration, the previous pixel initialization gate signal is deactivated, the present pixel initialization gate signal is activated, the present pixel data writing gate signal is activated and the present pixel emission signal is deactivated, and wherein during a third duration, the previous pixel initialization gate signal is deactivated, the present pixel initialization gate signal is deactivated, the present pixel data writing gate signal is activated and the present pixel emission signal is deactivated.

17. A display apparatus comprising:

a display panel comprising:

a first pixel circuit including a first pixel light emitting element, a first pixel driving transistor which applies a first pixel driving current to the first pixel light emitting element and a first pixel writing transistor which applies a first pixel data voltage to the first pixel driving transistor;

a second pixel circuit disposed adjacent to the first pixel circuit, the second pixel circuit including a second pixel light emitting element, a second pixel driving transistor which applies a second pixel driving current to the second pixel light emitting element and a second pixel writing transistor which applies a second pixel data voltage to the second pixel driving transistor;

a first initialization transistor including a gate electrode which receives an initialization gate signal, a first electrode connected to an anode electrode of the first pixel light emitting element and a second electrode connected to a gate electrode of the second pixel driving transistor, wherein the first electrode of the first initialization transistor is a source electrode, and the second electrode of the first initialization transistor is a drain electrode; and a second initialization transistor including a gate electrode which receives the initialization gate signal, a first electrode which receives an initialization voltage and a second electrode connected to the first electrode of the first initialization transistor;

a gate driver which outputs the initialization gate signal and a data writing gate signal to the display panel;

a data driver which outputs the first pixel data voltage and the second pixel data voltage to the display panel; and an emission driver which outputs an emission signal to the display panel, wherein the first pixel circuit and the second pixel circuit are disposed adjacent to each other in a same pixel column, and connected to a same data line.

18. An electronic apparatus comprising:

a display panel comprising:

a first pixel circuit including a first pixel light emitting element, a first pixel driving transistor which applies a first pixel driving current to the first pixel light emitting element and a first pixel writing transistor which applies a first pixel data voltage to the first pixel driving transistor;

a second pixel circuit disposed adjacent to the first pixel circuit, the second pixel circuit including a second pixel light emitting element, a second pixel driving transistor which applies a second pixel driving current to the second pixel light emitting element and a second pixel writing transistor which applies a second pixel data voltage to the second pixel driving transistor;

a first initialization transistor including a gate electrode which receives an initialization gate signal, a first electrode connected to an anode electrode of the first pixel light emitting element and a second electrode connected to a gate electrode of the second pixel driving transistor, wherein the first electrode of the first initialization transistor is a source electrode, and the second electrode of the first initialization transistor is a drain electrode; and a second initialization transistor including a gate electrode which receives the initialization gate signal, a first electrode which receives an initialization voltage and a second electrode connected to the first electrode of the first initialization transistor;

a gate driver which outputs the initialization gate signal and a data writing gate signal to the display panel;

a data driver which outputs the first pixel data voltage and the second pixel data voltage to the display panel and an emission driver which outputs an emission signal to the display panel;

a driving controller which controls the gate driver, the data driver and the emission driver; and a processor which outputs input image data and an input control signal to the driving controller, wherein the first pixel circuit and the second pixel circuit are disposed adjacent to each other in a same pixel column, and connected to a same data line.

* * * * *